(12) United States Patent
Jesuk

(10) Patent No.: US 7,212,724 B2
(45) Date of Patent: May 1, 2007

(54) JITTER CORRECTING APPARATUS AND METHOD FOR VIDEO SIGNALS

(75) Inventor: Lee Jesuk, Suwon (KR)

(73) Assignee: Samsung Electronics Co., Ltd. (KR)

( * ) Notice: Subject to any disclaimer, the term of this patent is extended or adjusted under 35 U.S.C. 154(b) by 521 days.

(21) Appl. No.: 10/874,073

(22) Filed: Jun. 22, 2004

(65) Prior Publication Data

US 2004/0234233 A1  Nov. 25, 2004

Related U.S. Application Data

(62) Division of application No. 09/532,178, filed on Mar. 20, 2000, now Pat. No. 6,801,706.

(30) Foreign Application Priority Data

Mar. 23, 1999 (KR) ..................................... 99-9835
Dec. 14, 1999 (KR) ................................... 99-57621

(51) Int. Cl.
*H04N 9/89* (2006.01)

(52) U.S. Cl. ........................ 386/13; 386/20; 348/497; 348/498

(58) Field of Classification Search ................... 386/2, 386/12, 13, 20, 21, 23, 46; 348/497, 498
See application file for complete search history.

(56) References Cited

U.S. PATENT DOCUMENTS 3,774,165 A    11/1973  McCann, Jr. et al. ..... 340/172.5
4,206,830 A     6/1980  Sohma et al. ................ 181/141
4,251,830 A     2/1981  Tatami ........................... 358/8
5,280,396 A     1/1994  Hamaguchi et al. ........ 360/36.1
5,453,885 A     9/1995  Takeshita et al. .......... 360/36.2
5,666,458 A     9/1997  Moon et al. .................... 386/2
6,801,706 B1 * 10/2004  Jesuk .......................... 386/20

* cited by examiner

*Primary Examiner*—Vincent F. Boccio
(74) *Attorney, Agent, or Firm*—Mills & Onello LLP

(57) ABSTRACT

A jitter correcting apparatus and method for a video signal in a video signal reproduction system includes a digital video decoder for demodulating an externally-applied video signal and a phase-locked loop for generating a first clock signal synchronized with the video signal. The system includes an address generator, a comparator and a dual port memory device. The address generator generates a write address for writing the video signal in response to the first clock signal, generates a read address for reading the video signal in response to a second clock signal having a fixed frequency, and corrects the write and read addresses in response to a head switching signal and first and second comparison signals. The comparator compares the write address with the read address and generates the first comparison signal and the second comparison signal according to a result of the comparison. The dual port memory device stores the video signal at a location corresponding to the write address in response to the first clock signal and outputs a video signal stored at a location corresponding to the read address in response to the second clock signal. Accordingly, the jitter of a video signal, which may occur while processing an analog video signal in a digital mode, is corrected using a memory device having a small capacity, thereby allowing a video image to be stably output.

13 Claims, 26 Drawing Sheets

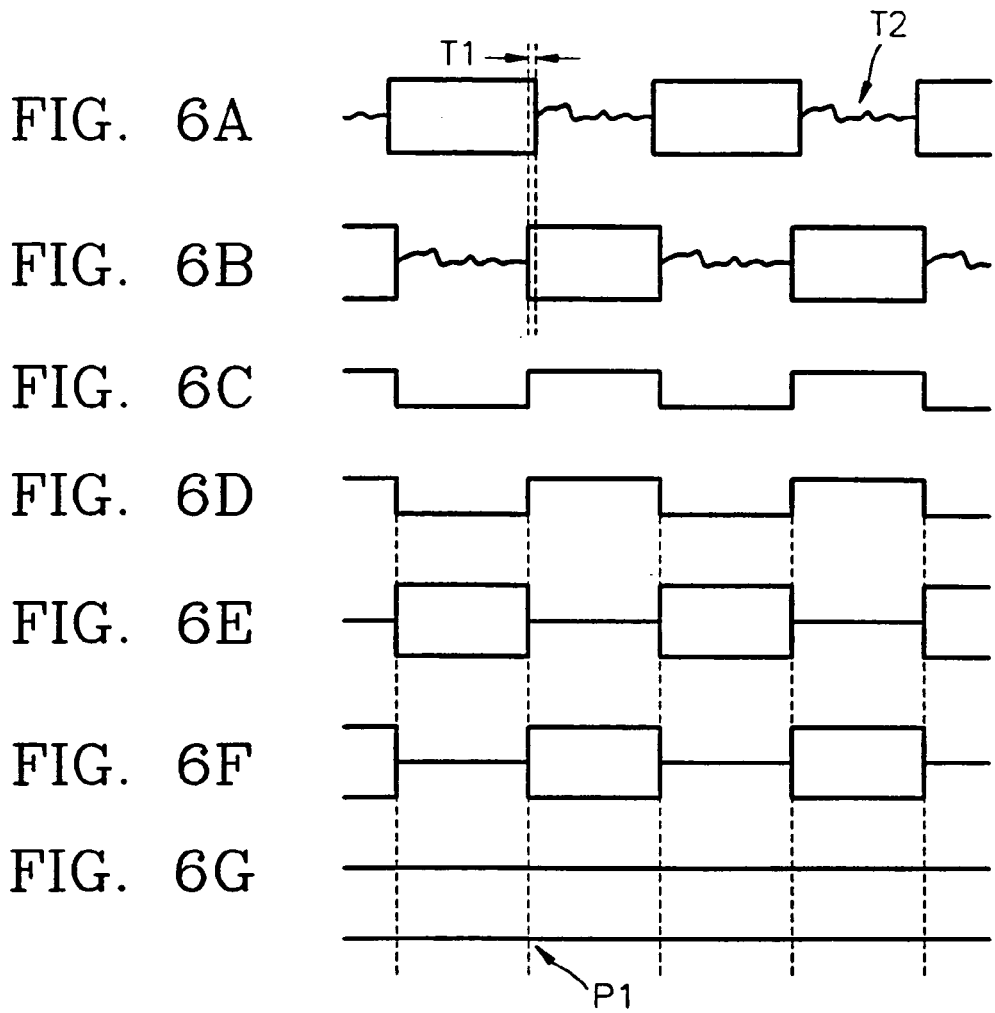
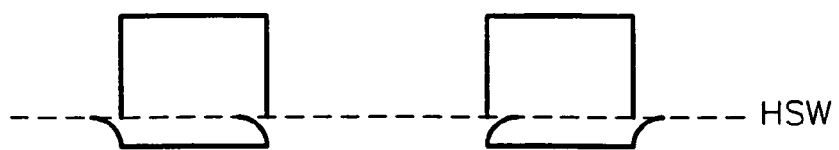
FIG. 7

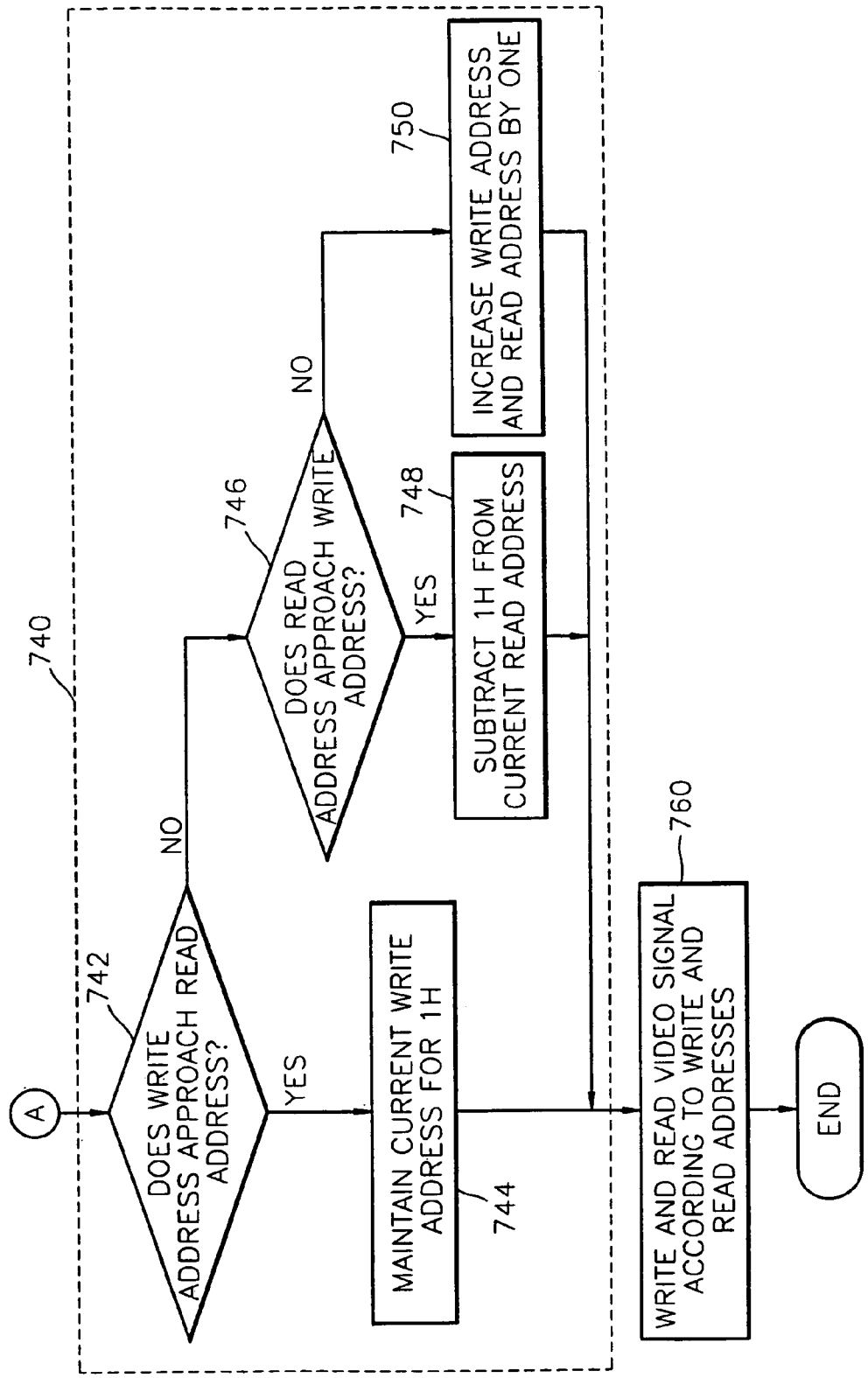

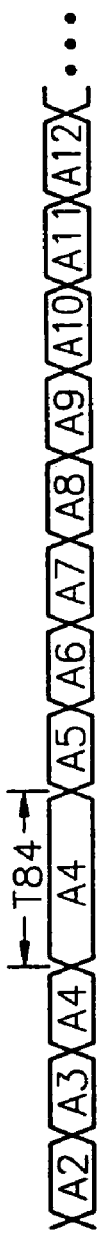
FIG. 17A
FIG. 17B
FIG. 17C
FIG. 17D

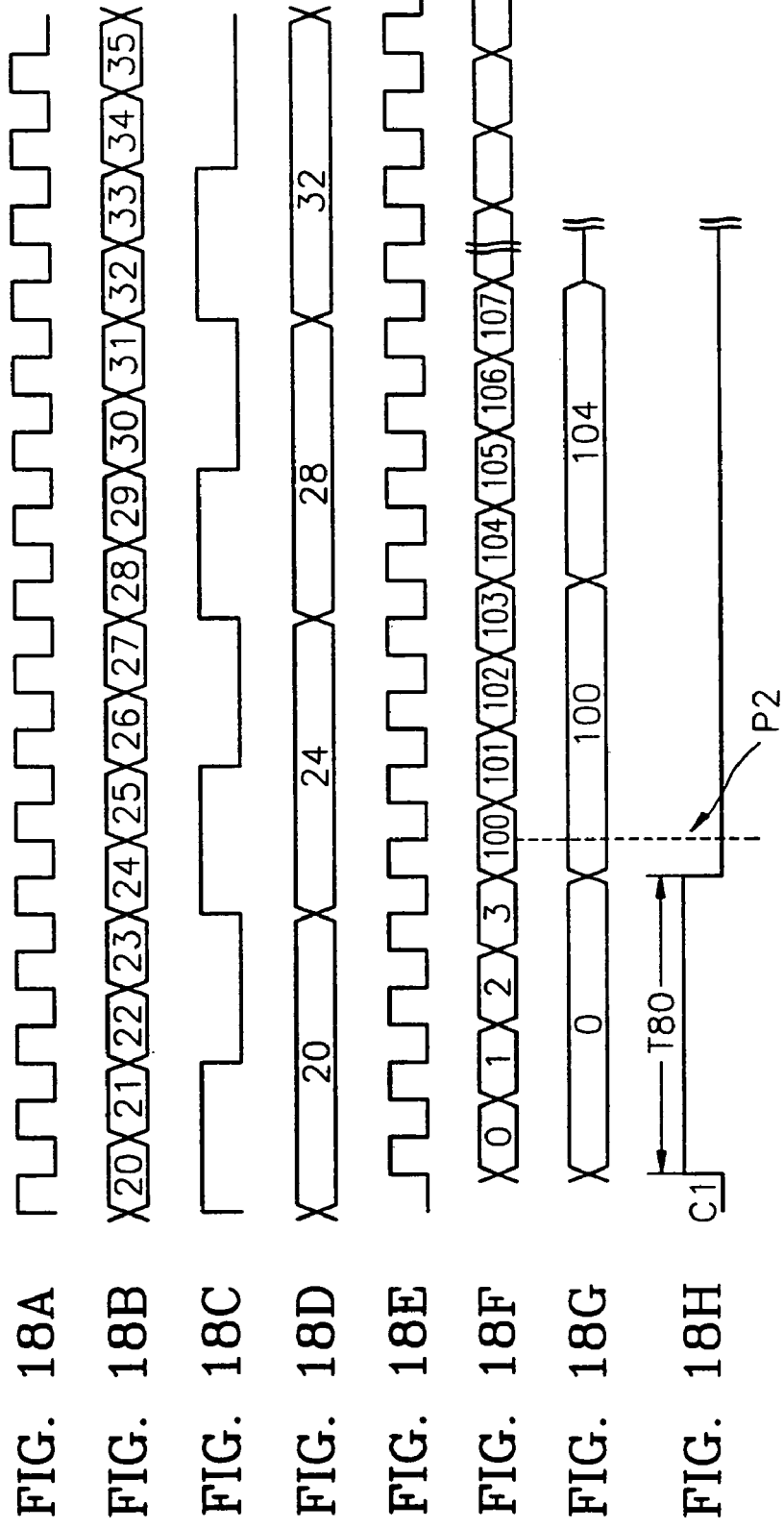

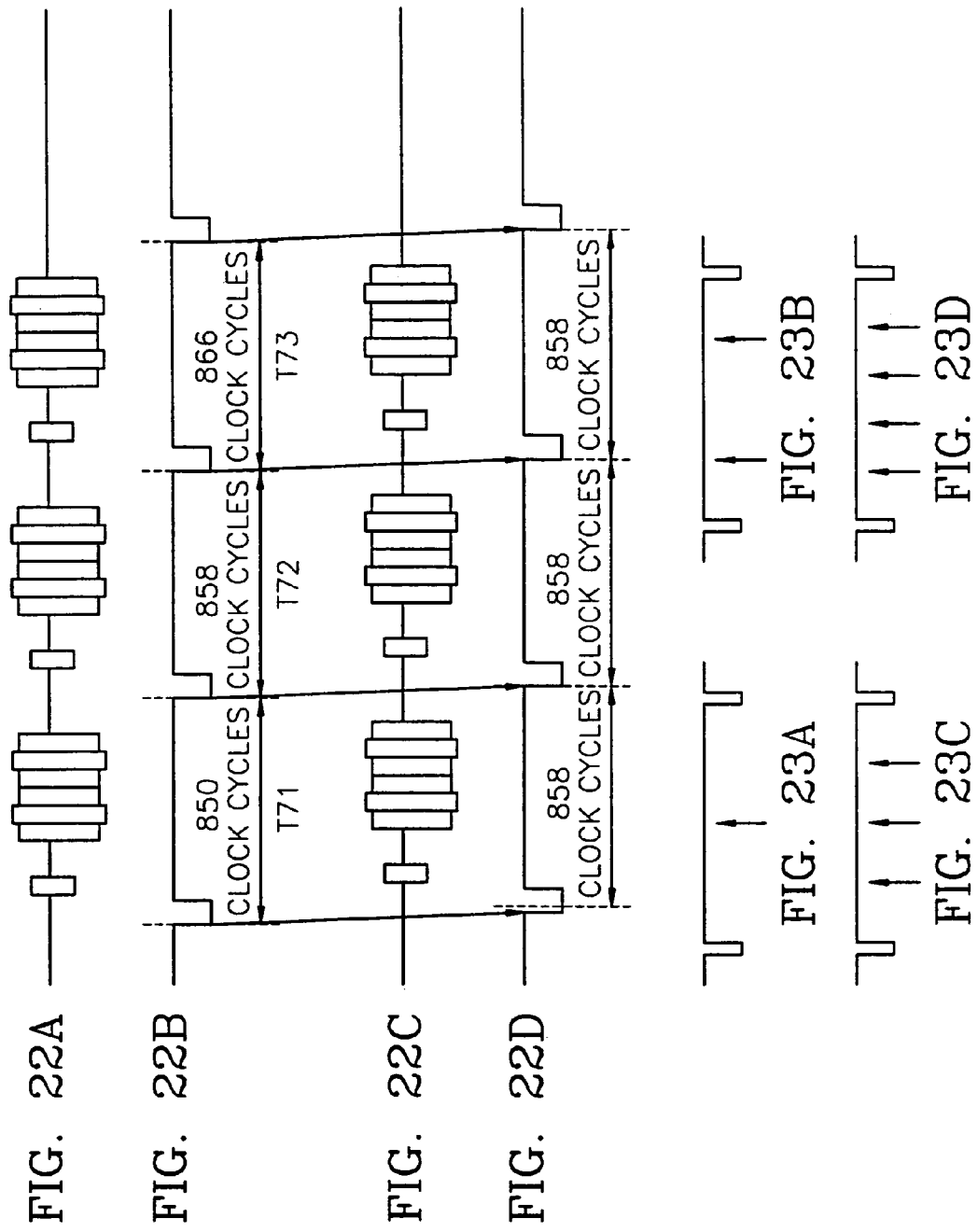

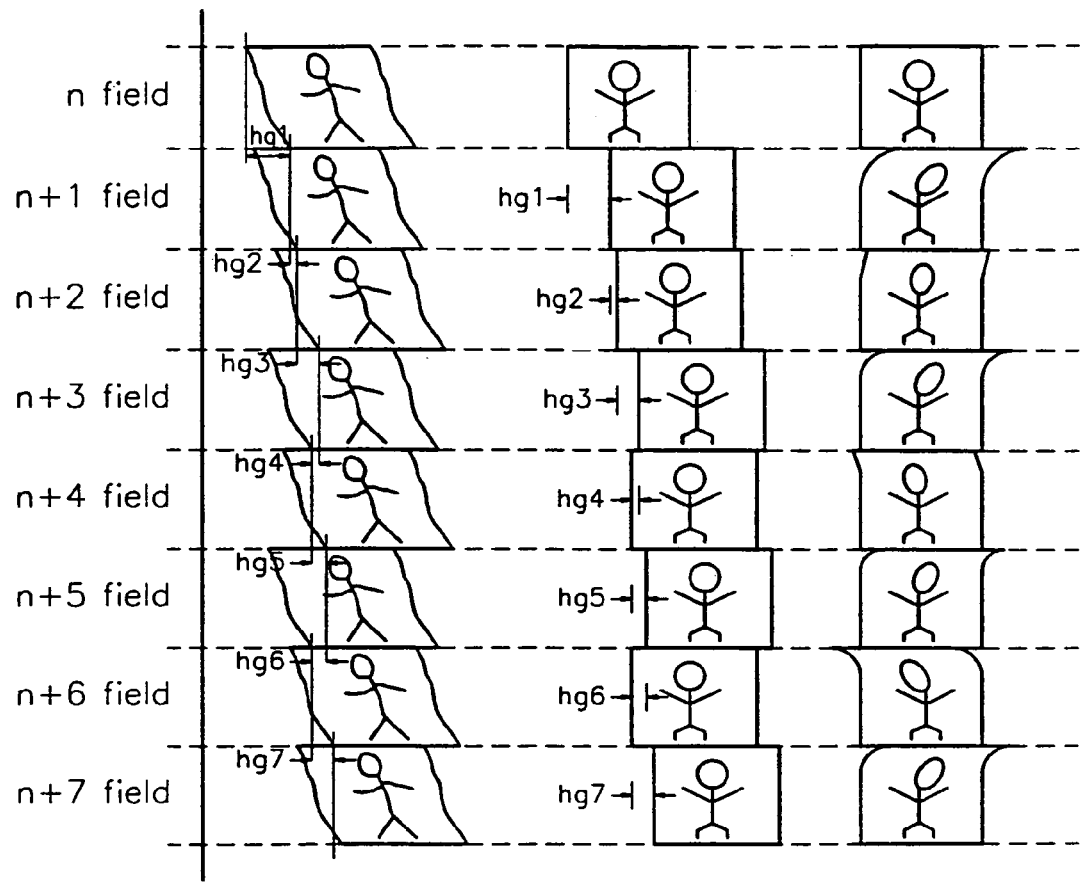
FIG. 24A   FIG. 24B   FIG. 24C
FIG. 24D
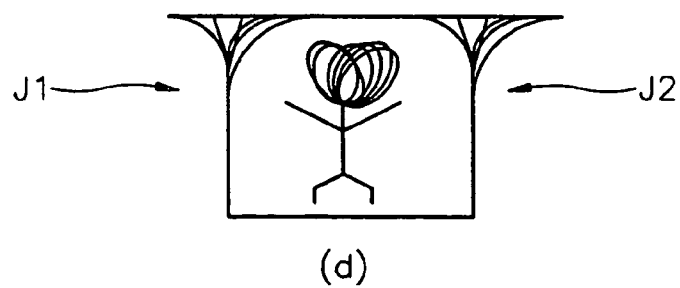
(d)

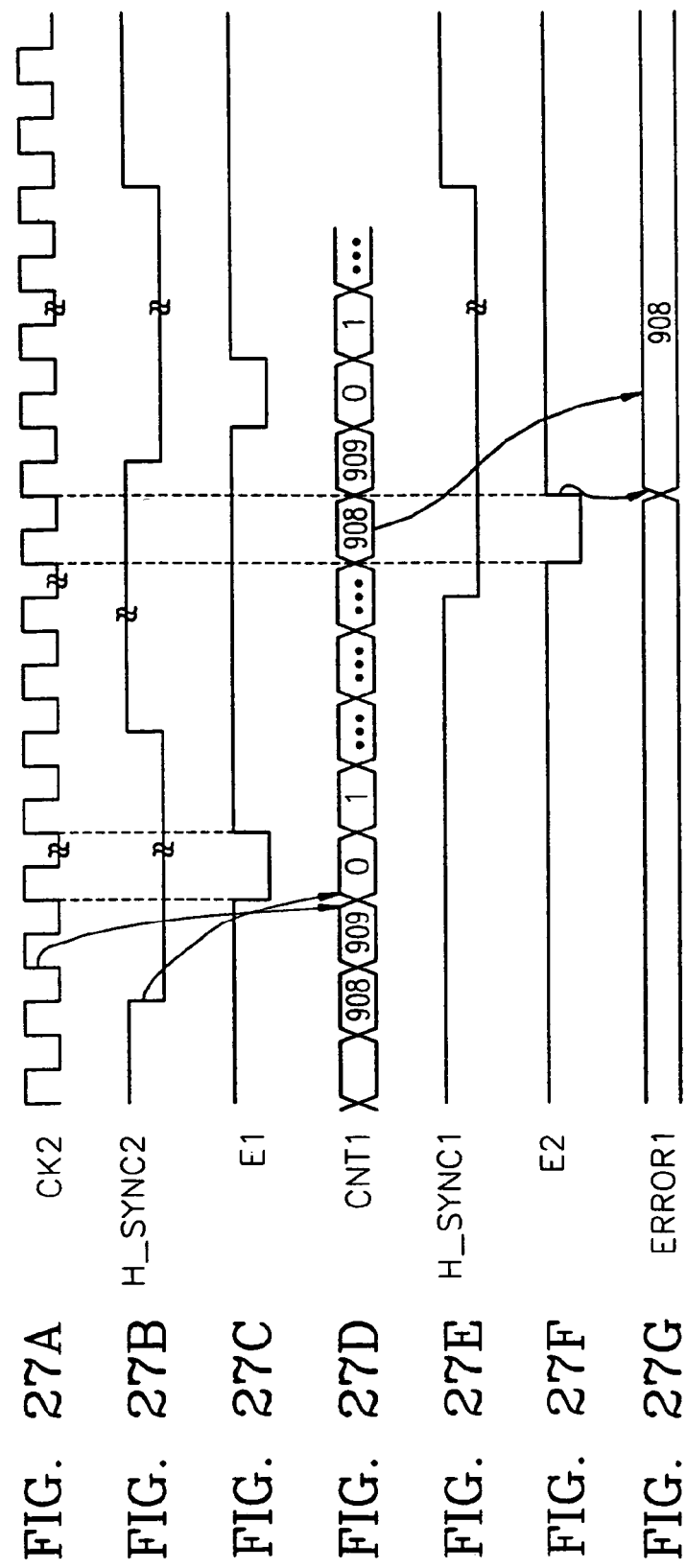

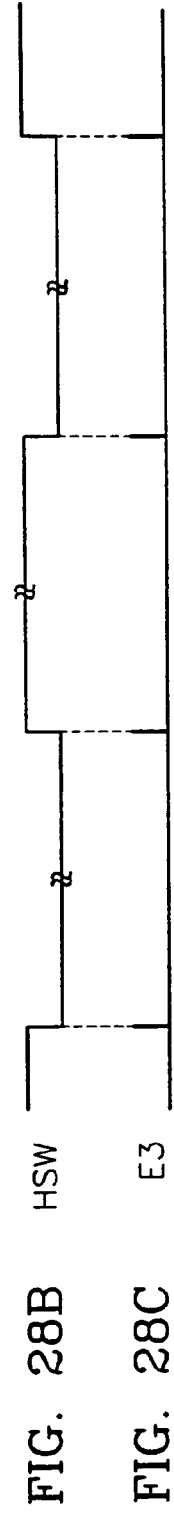
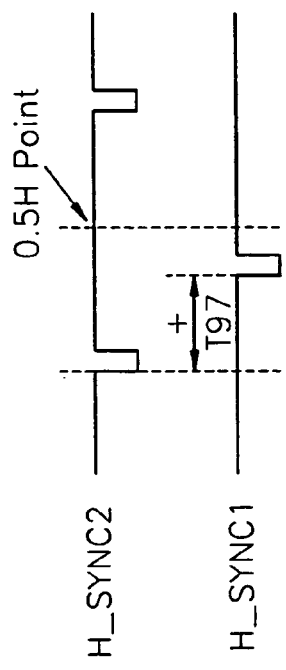
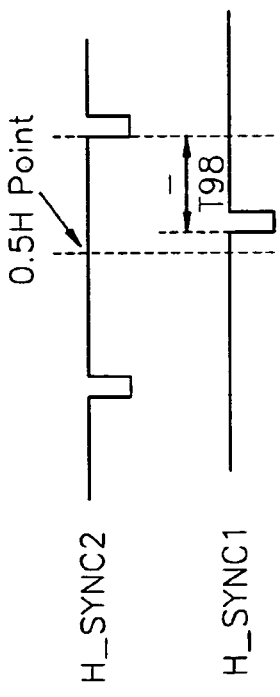
FIG. 28A
FIG. 28B
FIG. 28C
FIG. 28D
FIG. 29A
FIG. 29B

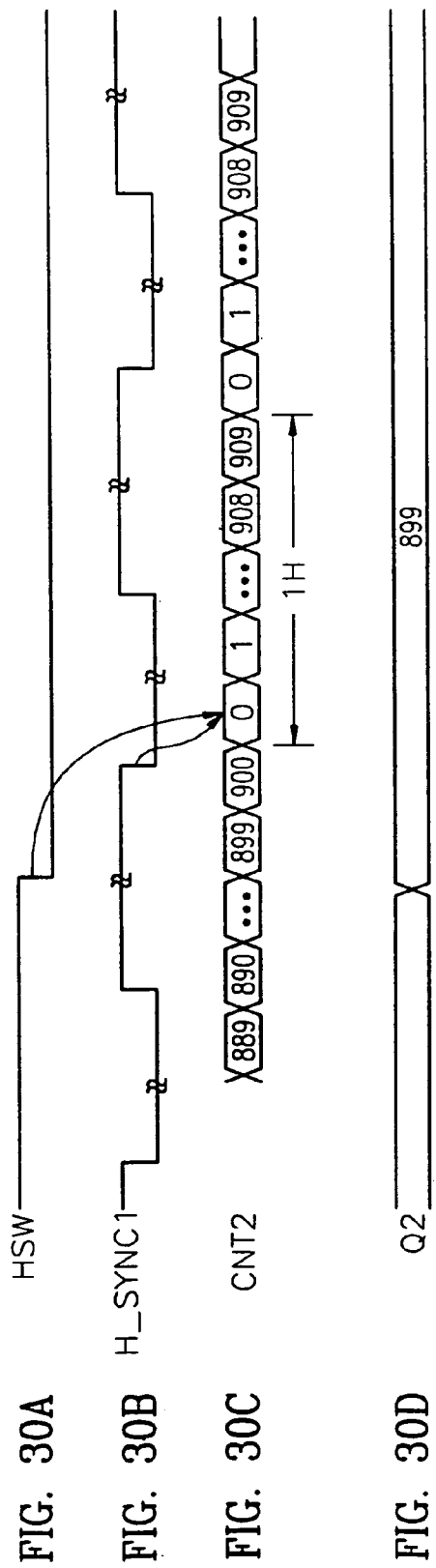
FIG. 30A HSW
FIG. 30B H_SYNC1
FIG. 30C CNT2
FIG. 30D Q2

JITTER CORRECTING APPARATUS AND METHOD FOR VIDEO SIGNALS

RELATED APPLICATIONS

This application is a divisional of U.S. application Ser. No. 09/532,178, filed on Mar. 20, 2000 now U.S. Pat. No. 6,801,706, which relies for priority upon Korean Patent Application Nos. 99-9835, filed on Mar. 23, 1999 and 99-57621, filed Dec. 14, 1999, the contents of which are herein incorporated by reference in their entirety.

BACKGROUND OF THE INVENTION

1. Field of the Invention

The present invention relates to a video reproduction system of a video cassette recorder, and more particularly, to a jitter correcting apparatus and method for correcting video signal jitter occurring in a video reproduction system.

2. Description of the Related Art

Generally, video signals displayed on television conform with broadcasting standards. However, the running structure of a tape drive is commonly unstable in a video reproduction system such as a video cassette recorder (VCR), such that jitter can occur in a reproduced video signal. If the reproduced video signal jitters, the horizontal frequency of the video signal changes and thus, the resulting picture on a video screen flickers. As a result, it is difficult to detect an accurate chrominance sub-carrier frequency from a video signal. Accordingly, it is difficult to reproduce colors of the originally recorded signal.

FIG. 1 is a block diagram for explaining a video reproduction system of a conventional VCR. The video reproduction system includes a head 11, an analog signal processor 12, an analog-to-digital converter (ADC) 14, a video decoder 16, a jitter correcting apparatus 18 and a video encoder 20.

The analog signal processor 12 frequency-demodulates a magnetic signal read by the head 11 and outputs an analog video signal which is modulated into a chrominance sub-carrier. The ADC 14 converts the analog video signal output from the analog signal processor 12 into a digital signal. The digitized video signal is decoded by the video decoder 16. The jitter of the decoded video signal Y/U/V is corrected by the jitter correcting apparatus 18 and then output as a video signal Y1/U1/V1 absent jitter. The jitter-free video signal Y1/U1/V1 is encoded by the video encoder 20 and output through an output terminal OUT.

The top and bottom waveforms of FIG. 2A demonstrate synchronizing signals of a video signal when jitter does not occur and when jitter occurs, respectively. The top and bottom waveforms of FIG. 2B demonstrate pilot signals of a low-band-converted chrominance signal when jitter does not occur and when jitter occurs, respectively.

As shown in FIG. 2A, the horizontal frequency of a jittered video signal shown in the lower portion does not comport with that of a normal jitter-free video signal shown in the upper portion. Similarly, in FIG. 2B, the frequency of the pilot signal of a jittered chrominance signal shown in the lower portion does not comport with that of pilot signal of a normal jitter-free chrominance signal shown in the upper portion.

In a conventional approach for solving these problems, the running structure of a video tape reproduction system is strictly controlled to adjust reproduction speed, thereby improving the jitter and the color reproduction of an image. However, control over the running structure has a mechanical limit, such that correction beyond a certain performance limit cannot be accomplished. In a more advanced method for addressing this issue, a digital signal processing technique is employed to correct video signal jitter.

FIG. 3 is a block diagram for explaining a video signal jitter correcting apparatus using a conventional digital signal processing technique. Referring to FIG. 3, a digital video signal is applied to a digital video demodulator 30 via an input terminal IN and demodulated in response to a write clock signal WCK generated by a phase-locked loop (PLL) 32. The demodulated signal is stored in a memory device 34 in response to the write clock signal WCK. The stored video signal is read in response to a read clock signal RCK having a fixed frequency and applied to a digital video modulator 36. A synchronizing signal separator 37 detects a horizontal synchronizing signal from the input video signal. The detected horizontal synchronizing signal is locked every line in a PLL 32 and thus, a locked write clock signal WCK is generated.

If an input video signal includes jitter, then the write clock signal WCK generated by the PLL 32 also has jitter. In addition, any jitter generated in the PLL 32 may cause jitter of the write clock signal WCK. A video signal which is demodulated by a jittered write clock signal WCK naturally includes jitter. In removing such jitter, the memory device 34 such as a frame or field memory is required. Accordingly, the overall circuit size of a jitter correcting apparatus for a video signal using the conventional digital scheme increases due to the capacity of the memory device 34, and accordingly, the cost of system implementation increases.

Moreover, during sampling operation of the digital video demodulator 30 of FIG. 3, if a write clock signal WCK includes jitter, faithful color reproduction is difficult when demodulating a modulated chrominance signal. The modulated chrominance signal is a signal obtained by modulating a chrominance signal by a carrier frequency. Since the standard of the carrier frequency is established in the unit of several hundreds of parts per million (ppm), the modulated chrominance signal is a very precise signal. On the other hand, the range of jitter appearing in the write clock signal WCK due to jitter in the synchronizing signal or the PLL 32 is very large. Accordingly, when sampling a modulated chrominance signal using a write clock signal WCK, the sampling point also varies according to the jitter. Thus, the sampling value is inaccurate and, as a result, it is difficult to faithfully demodulate the chrominance signal.

In yet another method for correcting jitter in an image, interpolation is used to improve color reproduction without using a frame or field memory. In other words, in the method using interpolation, a jitter-free clock signal is generated by sampling the video signal to demodulate the video signal, and interpolation is used for the output signal. In an analog video signal image, the length of each horizontal line can be varied and thus, the number of pixels of a video signal can be varied according to the length of a horizontal line. However, after the interpolation, the number of pixels becomes constant regardless of the length of a line. In this case, the interpolation has the effect of low pass filtering, and thus the high frequency component of a luminance signal may be blocked. Accordingly, the conventional method of correcting jitter in a video signal using interpolation may cause severe deterioration of the resolution of a luminance signal. Particularly, the jitter correcting method using interpolation is not suitable for a video signal which does not comport with the standard.

SUMMARY OF THE INVENTION

To solve the above problems, it is an object of the present invention to provide a jitter correcting apparatus for a video signal, for faithfully reproducing a chrominance signal without deteriorating the resolution of a luminance signal, even though the jitter correcting apparatus uses a memory device with small capacity.

It is another object of the present invention to provide a jitter correction method for a video signal, which is performed by the jitter correcting apparatus.

Accordingly, to achieve the first object in one aspect, there is provided a jitter correcting apparatus for correcting jitter of a video signal in a video signal reproduction system including a digital video decoder for demodulating the externally-applied video signal and a first clock circuit (for example a phase-locked loop) for generating a first clock signal synchronized with the video signal. The jitter correcting apparatus includes an address generator, a comparator and a dual port memory device. The address generator generates a write address for writing the video signal in response to the first clock signal, generates a read address for reading the video signal in response to a second clock signal having a fixed frequency, and corrects the write and read addresses in response to first and second comparison signals. The comparator compares the write address with the read address and generates the first comparison signal and the second comparison signal according to a result of the comparison. The dual port memory device stores the video signal at a location corresponding to the write address in response to the first clock signal and outputs a video signal stored at a location corresponding to the read address in response to the second clock signal.

To achieve the first object in another aspect, there is provided a jitter correcting apparatus for correcting jitter of an externally-applied input video signal in a video signal reproduction system including a digital video decoder for demodulating a luminance signal of the video signal in response to a first clock signal having a variable frequency and demodulating a chrominance signal of the video signal in response to a second clock signal of a fixed frequency. The jitter correcting apparatus includes a luminance signal address generator, a first dual port memory device, a chrominance signal address generator and a second dual port memory device. The luminance signal address generator generates a luminance signal write address for writing the luminance signal in response to the first clock signal, generates a luminance signal read address for reading the luminance signal in response to the second clock signal, compares the luminance signal write address with the luminance signal read address, and corrects the luminance signal read and write addresses based on a result of the comparison. The first dual port memory device stores the luminance signal at a location corresponding to the luminance signal write address in response to the first clock signal and outputs the luminance signal stored at a location corresponding to the luminance signal read address in response to the second clock signal. The chrominance signal address generator generates a chrominance signal write address for writing the chrominance signal and a chrominance signal read address for reading the chrominance signal, in response to the second clock signal, compares the chrominance signal write address with the chrominance signal read address, and corrects the chrominance signal read and write addresses based on a result of the comparison. The second dual port memory device stores the chrominance signal at a location corresponding to the chrominance signal write address and outputs the chrominance signal stored at a location corresponding to the chrominance signal read address, in response to the second clock signal.

To achieve the second object in one aspect, there is provided a jitter correcting method for a video signal, and the method includes steps (a) through (d). In step (a), a write address for the video signal is generated in response to a first clock signal having a variable frequency, and a read address is generated in response to a second clock signal having a fixed frequency. In the step (b), the read address is reset, and then accumulated errors between write addresses and read addresses are corrected at the time when a head switching signal is generated. In the step (c), the approach state between a current write address and a current read address is determined after the step (b), and the write address or the read address is corrected. In the step (d), the video signal is written and read in response to the corrected write address and the corrected read address.

To achieve the second object in another aspect, there is provided a method for correcting jitter of a video signal while writing the video signal composed of a chrominance signal, a luminance signal and horizontal and vertical synchronizing signals into corresponding dual port memory devices and reading the written video signal, and the method includes steps (a) through (e). In the step (a), luminance and chrominance signal write addresses are generated in response to a first clock signal having a variable frequency or in response to a second clock signal having a fixed frequency, and luminance and chrominance signal read addresses are generated in response to the second clock signal. In the step (b), a horizontal cycle of the video signal is corrected, and an error value corresponding to the average skew of a field of the video signal is generated. In the step (c), the luminance and chrominance signal read addresses are reset when a head switching signal is generated in response to the error value, so as to compensate for accumulated errors between write addresses and read addresses. In the step (d), approach states between the luminance and chrominance signal write addresses and the luminance and chrominance signal read addresses, respectively, are determined after the step (c), and the write addresses or the read addresses are corrected. In the step (e), the video signal is written and read in response to the corrected luminance and chrominance signal write and read addresses.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 6A through 6G are waveform diagrams for explaining signals of the data reader of FIG. 5.

FIG. 7 is a diagram for explaining video signal output at the time when a head switching signal is generated.

FIGS. 13A and 13B are flowcharts for explaining a jitter correction method for a video signal according to an embodiment of the present invention.

FIGS. 17A through 17D are waveform diagrams for explaining the operation of the apparatus of FIG. 10 when a write address approaches a read address.

FIGS. 18A through 18H are waveform diagrams for explaining the operation of the apparatus of FIG. 10 when a read address approaches a write address.

FIGS. 22A through 22D are diagrams for explaining the correction for a chrominance signal performed by the apparatus of FIG. 21.

FIGS. 23A through 23D are diagrams for explaining the position of correction during the correction for the chrominance signal.

FIGS. 24A through 25D are diagrams for explaining the results of jitter correction for a video signal according to the present invention.

FIGS. 27A through 30D are waveform diagrams for explaining the operation of the error signal generator of FIG. 26.

DETAILED DESCRIPTION OF THE INVENTION

A jitter correcting apparatus for a video signal according to the present invention will now be described with reference to the accompanying drawings.

Figure 1:
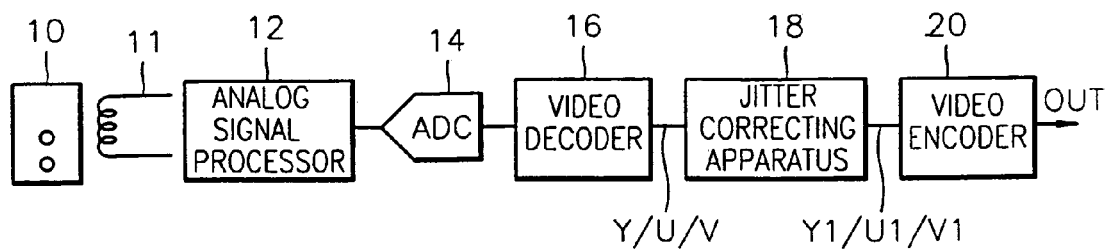
FIG. 1 is a block diagram for explaining a video reproduction system of a conventional video cassette recorder.
Figure 2A:
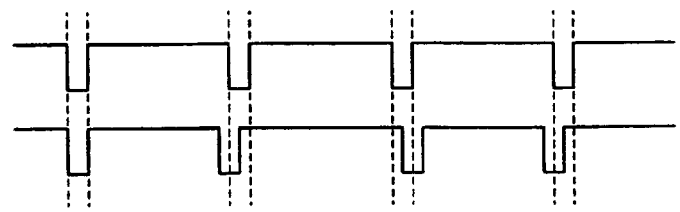
FIGS. 2A and 2B are diagrams for explaining a case in which a video signal has jitter and a chrominance sub-carrier signal has jitter.
Figure 2B:
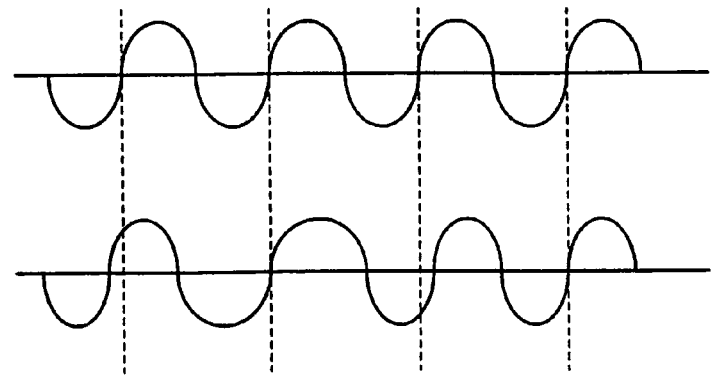
Figure 3:
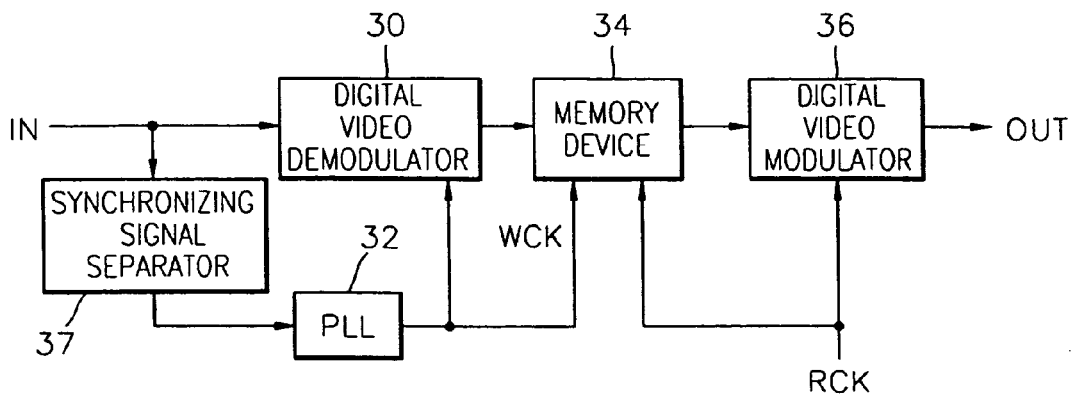
FIG. 3 is a block diagram of a conventional jitter correcting apparatus for a video signal.
Figure 4:
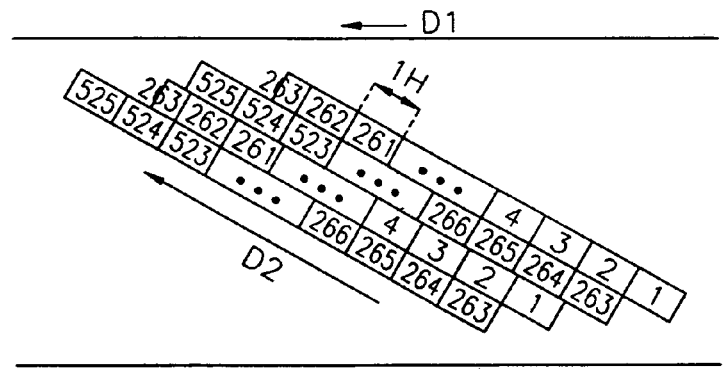
FIG. 4 is a diagram for showing a reproduction procedure of a general video tape.

In FIG. 4 for explaining the reproduction procedure of a general video tape, arrow D1 indicates the running direction of a tape and arrow D2 indicates the direction of rotation of the head. In other words, data is recorded on a tape at an angle relative to the running direction D1 of the tape to maximize the amount of video data stored in a small area of the video tape. When reading recorded data, generally, two heads are used, and each of the two heads reads each field of video data.

Figure 5:
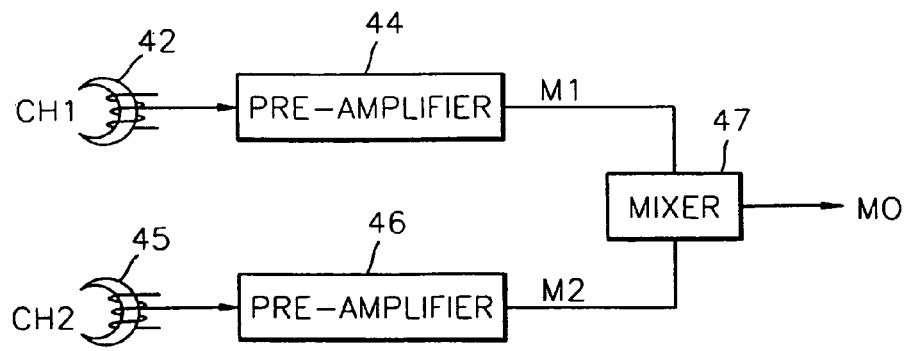
FIG. 5 is a block diagram for explaining a data reader which reads a video signal using two heads during the tape reproduction of FIG. 4.

FIG. 5 is a block diagram for explaining a data reader which reads a video signal using two heads during the tape reproduction of FIG. 4. The data reader includes pre-amplifiers 44 and 46 and a mixer 47. The pre-amplifier 44 is connected to a first head 42 of a first channel and the pre-amplifier 46 is connected to a second head 45 of a second channel.

The pre-amplifiers 44 and 46 of FIG. 5 amplify signals read from the heads 42 and 45 to predetermined levels and output amplified signals M1 and M2, respectively. The mixer 47 mixes the amplified signals M1 and M2 output from the pre-amplifiers 44 and 46 and outputs a mixed signal MO.

FIGS. 6A through 6G are waveform diagrams for explaining signals processed by the data reader of FIG. 5. FIG. 6A shows the output signal M1 of the pre-amplifier 44. FIG. 6B shows the output signal M2 of the pre-amplifier 46. FIG. 6C shows a head switching signal for the first channel. FIG. 6D shows a head switching signal for the second channel. FIGS. 6E and 6F show the output signals M1 and M2, respectively, of the pre-amplifiers 44 and 46, respectively, when the head switching signals are applied. The waveforms of FIG. 6G show the output signal MO of the mixer 47.

Referring to FIGS. 6A through 6G and FIG. 5, when the fields of a video signal are read using the heads 42 and 44 of the first and second channels, respectively, overlap of signals may occur at a portion P1 at which one field is switched to the other field. A section T1 of FIG. 6A indicates a portion in which overlap occurs, and a section T2 indicates a portion in which noise occurs. Accordingly, a video signal is switched by the head switching signals shown in FIGS. 6C and 6D in the section T1 in which overlap occurs, so that a continuous video signal without overlap as shown in FIGS. 6E and 6F can be generated. During the section T1 in which overlap occurs, a video signal may not be correctly connected and as a result the cycle of the video signal may be altered. Consequently, skew appears in a reproduced picture of the video signal.

FIG. 7 is a diagram for explaining video signal output at the time when a head switching signal HSW is generated. As shown in FIG. 7, the skew may occur in a picture at a head switching point at which the overlap of an image occurs. However, since the head switching point is within a margin which does not actually appear in a video display device such as a monitor, skew occurring in a picture is not discernable to a viewer.

The present invention simultaneously compensates for accumulated jitter during head switching. In addition, the present invention uses a memory device with small capacity and controls the generation of an address for writing or reading a video signal. Accordingly, the present invention allows for implementation of a jitter correcting apparatus for a video signal, which allows a video signal to be accurately reproduced in a digital mode without increasing circuit size. Such a jitter correcting apparatus for a video signal can be referred to as a time based correction (TBC) circuit.

Figure 8:
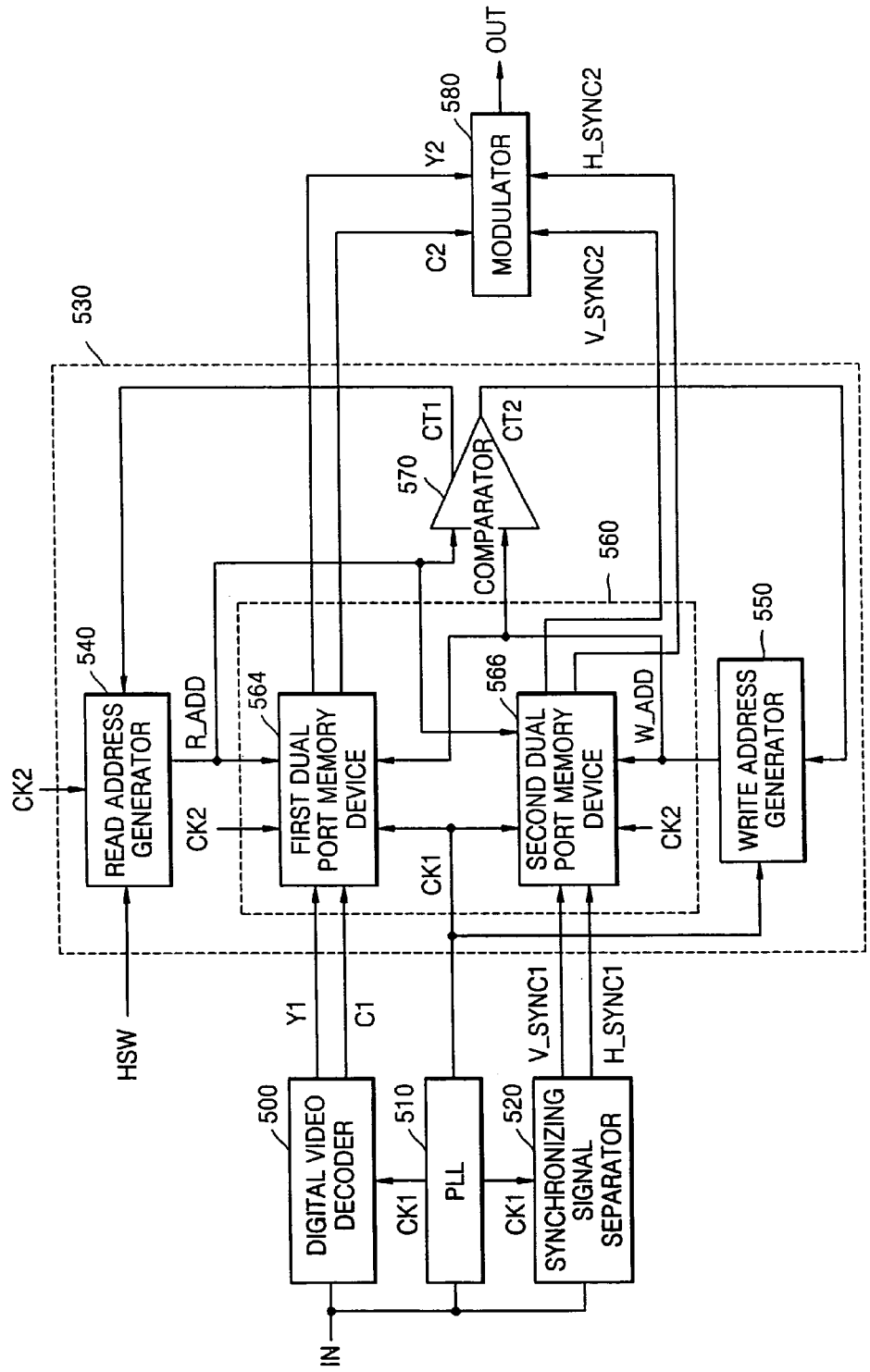
FIG. 8 is a block diagram schematically showing a video reproduction system of a video cassette recorder, utilizing a jitter correcting apparatus for a video signal according to an embodiment of the present invention.

FIG. 8 is a block diagram schematically depicting a video reproduction system of a video cassette recorder, in which a jitter correcting apparatus 530 according to an embodiment of the present invention is used. The video reproduction system includes a digital video decoder 500, a phase-locked loop (PLL) 510, a synchronizing signal separator 520, a jitter correcting apparatus 530 and a modulator 580.

The digital video decoder 500 receives a video signal via an input terminal IN and demodulates a luminance signal Y1 and a chrominance signal C1 according to a first clock signal CK1 generated by the PLL 510. The PLL 510 generates a write signal WCK, namely, the first clock signal CK1, in synchronization with the video signal which is applied thereto via the input terminal IN. The synchronizing signal separator 520 separates a first vertical synchronizing signal V_SYNC1 and a first horizontal synchronizing signal H_SYNC1, from the video signal applied thereto via the input terminal IN.

The jitter correcting apparatus 530 includes a read address generator 540, a dual port memory device 560, a write address generator 550 and a comparator 570. The dual port memory device 560 includes a first dual port memory device 564 and a second dual port memory device 566. In other words, the jitter correcting apparatus 530 removes jitter appearing in the first luminance signal Y1 and the first chrominance signal C1 and the first horizontal and vertical synchronizing signals H_SYNC1 and V_SYNC1, which are input thereto, and outputs jitter-free signals. The jitter-free horizontal and vertical synchronizing signals are referred to as the second horizontal synchronizing signal H_SYNC2 and the second vertical synchronizing signal V_SYNC2. The jitter-free luminance and chrominance signals are referred to as the second luminance signal Y2 and the second chrominance signal C2.

In the jitter correcting apparatus 530, the read address generator 540 generates a read address R_ADD of the video signal in response to a second clock signal CK2 which is a read clock signal. The read address R_ADD is reset in response to a head switching signal HSW and controlled by a first comparison signal CT1. The second clock signal CK2 may be generated by a crystal oscillator (not shown) which generates an oscillation signal having a fixed frequency.

The write address generator 550 generates a write address W_ADD of the video signal in response to the first clock signal CK1 generated by the PLL 510. The generated write address W_ADD is controlled by a second comparison signal CT2. The first clock signal CK1 is a clock signal synchronized with the PLL 510 and therefore may include jitter, as described above.

The first dual port memory device 564 writes the first luminance signal Y1 and the first chrominance signal C1 to a predetermined location corresponding to the write address W_ADD in response to the first clock signal CK1. Alternately, the first dual port memory device 564 reads a chrominance signal and a luminance signal which is stored in a predetermined location corresponding to the read address R_ADD in response to the second clock signal CK2.

The second dual port memory device 566 writes the first horizontal synchronizing signal H_SYNC1 and the first vertical synchronizing signal V_SYNC1 and reads a written signal in a similar manner to that in the first dual port memory device 564. The dual port memory devices 564 and 566 can each be implemented by a line memory which has enough capacity to store the data of one recorded data line. However, taking into account an error during reproduction of a video tape, each of the dual port memory devices 564 and 566 is preferably implemented to have 1.5 H, considering a predetermined margin to be 1 H. 1 H indicates the length of one line, that is, the interval from one horizontal synchronizing signal to a succeeding horizontal synchronizing signal. For example, for a video signal accurately comporting with the video standard, such as a TV signal, the error between a write clock signal and a read clock signal is small. Accordingly, the sum of accumulated errors at the end of a single field is merely several hundreds of ns. However, in a case of reproducing a video signal from a video tape, the sum of accumulated errors is very large and may reach tens of µs.

The comparator 570 determines the approach state between the read address R_ADD and the write address W_ADD and generates the first and second comparison signals CT1 and CT2 for regulating the read address R_ADD and the write address W_ADD according to the determined result. The determination of the approach state between the two addresses is performed by detecting whether the interval between the two addresses is smaller than a predetermined distance. The first comparison signal CT1 is defined as a signal for controlling the read address R_ADD when the read address R_ADD approaches the write address W_ADD. The second comparison signal CT2 is defined as a signal for controlling the write address W_ADD when the write address W_ADD approaches the read address R_ADD.

The second luminance and chrominance signals Y2 and C2 and the horizontal and vertical synchronizing signals H_SYNC2 and V_SYNC2, which are obtained through such jitter correction, are modulated by the modulator 580 and then output via the output terminal OUT. The luminance signal Y1 and the chrominance signal C1 extracted by the digital video decoder 500 of FIG. 8 are synchronized with the externally input video signal and the PLL 510. Accordingly, the first clock signal CK1 generated by the PLL 510 may have jitter. A jittered video signal is temporarily stored in the dual port memory device 560 by the jittered first clock signal CK1. Consequently, the jittered video signal stored in the dual port memory device 560 is read by the second clock signal CK2 having a fixed frequency to obtain the video signal from which the jitter is removed.

Figure 9A:
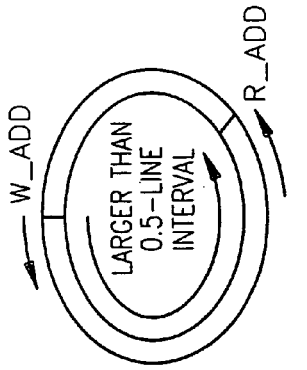
FIGS. 9A through 9C are diagrams for showing the relation between a write address and a read address of a dual port memory device of FIG. 8.
Figure 9B:
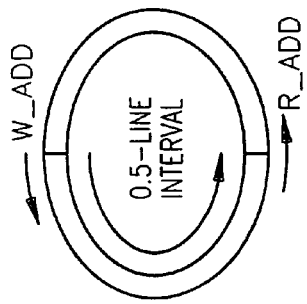
Figure 9C:
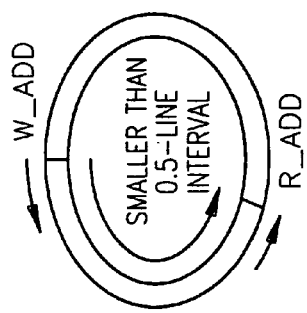

FIGS. 9A through 9C are diagrams for showing the relation between the write address W_ADD and the read address R_ADD of the dual port memory device 560 of FIG. 8. For illustrative purposes, the relation between the write address W_ADD and the read address R_ADD is shown in a ring buffer structure.

In a normal state, the write address W_ADD and the read address R_ADD are generated so as to be spaced 0.5-line (H) apart as shown in FIG. 9B. FIG. 9A shows a case in which the interval between the write address W_ADD and the read address R_ADD is smaller than 0.5 lines. FIG. 9C shows a case in which the interval between the write address W_ADD and the read address R_ADD is larger than 0.5 lines.

In a case of general VCR reproduction, the probability of the error between the write address W_ADD and the read address R_ADD is small. However, when the errors of many fields are accumulated, the write address W_ADD may approach the read address R_ADD or the read address R_ADD may approach the write address W_ADD. In this case, the regularity of a video signal is broken and a picture may be abnormally displayed. To prevent these problems, the present invention regulates the interval between the read address R_ADD and the write address W_ADD to be 0.5 lines at a predetermined point for each field of a video signal. A head switching time location of a video reproduction system can be used as an address regulation point and the address regulation point is implemented to be at the end of each field. The jitter correcting apparatus 530 simultaneously compensates for the accumulated jitter error at the point in time when the head switching signal HSW is generated (see FIG. 7).

During general reproduction of a video tape, the interval between a read address R_ADD and a write address W_ADD in each field does not deviate from 0.5 lines. However, when multiple-speed reproduction, fast forward reproduction or rewind reproduction is performed, or when a video tape reproduction system has a defect in itself or is subject to shock, the interval between a read address R_ADD and a write address W_ADD in a field may deviate from 0.5 lines. In this case, the interval between two addresses is detected by the comparator 570 of FIG. 8 and thus, the generation of write and read addresses is controlled to accommodate the variation.

Figure 10:
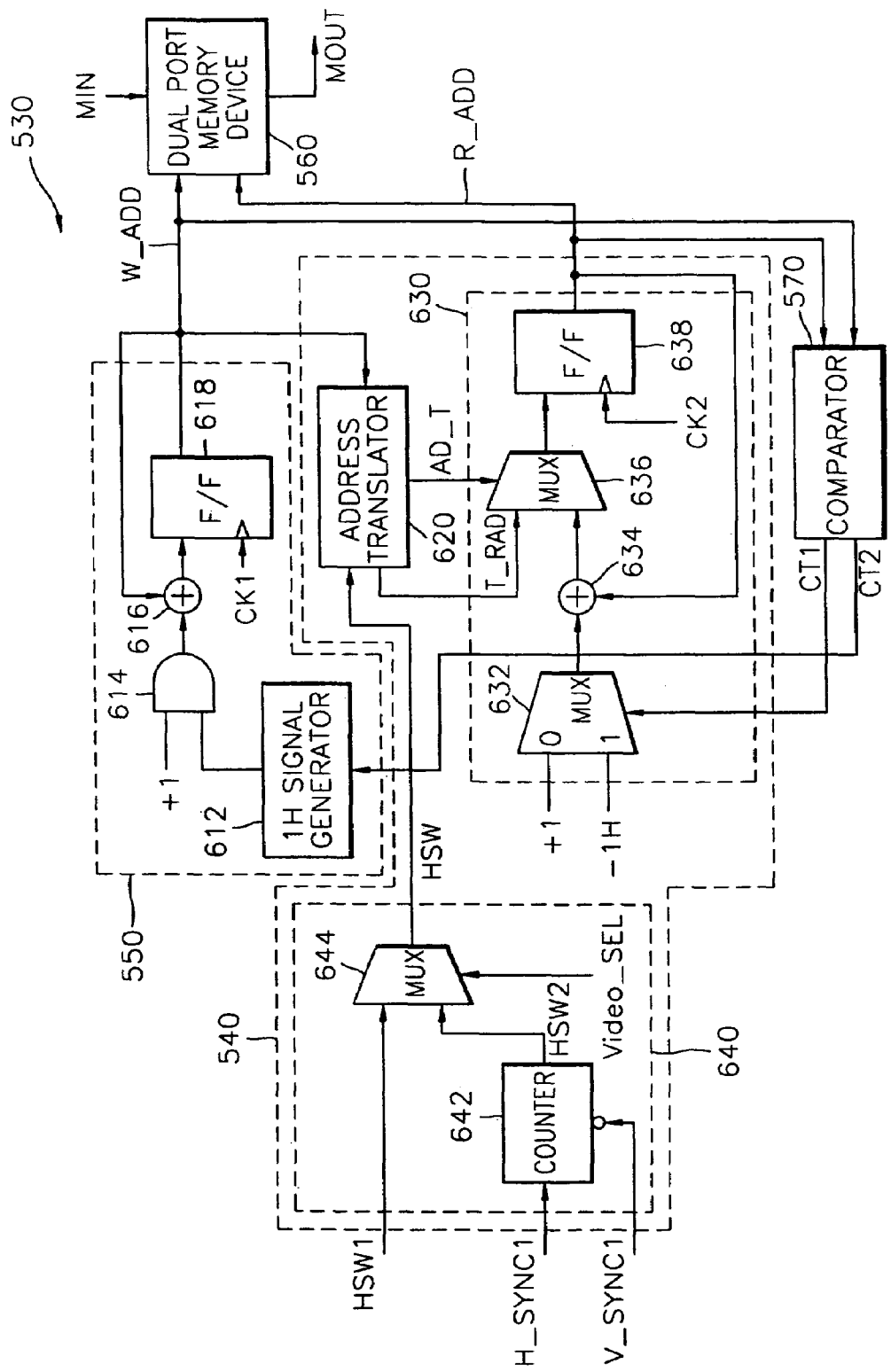
FIG. 10 is a detailed block diagram of the jitter correcting apparatus depicted in FIG. 8.

FIG. 10 is a detailed block diagram of the jitter correcting apparatus 530 depicted in FIG. 8. Referring to FIG. 10, the write address generator 550 increases a write address W_ADD by one or holds the current write address W_ADD for a predetermined period of time in response to the second comparison signal CT2. For this operation, the write address generator 550 includes a 1 H signal generator 612, an AND gate 614, an adder 616 and a flip-flop (F/F) 618. The 1 H signal generator 612 generates a signal having a "low" level for time duration of 1 H in response to the second comparison signal CT2. The AND gate 614 performs an AND operation on the output of the 1 H signal generator 612 and "1" and outputs the result of the AND operation. The result of the AND operation is added to a previous write address by the adder 616 and the result of the addition is applied to the F/F 618 as a data input. The F/F 618 outputs the output of the adder 616 as the write address W_ADD in response to the first clock signal CK1.

The read address generator 540 includes a head switching signal generator 640, an address translator 620 and a read address output unit 630. The head switching signal generator 640 outputs a first head switching signal HSW1 applied from the outside or a second head switching signal HSW2 output from a counter 642, as the head switching signal HSW. The second head switching signal HSW2 is set according to a line counting value corresponding to a vertical synchronizing signal V_SYNC1. For this operation, the head switching signal generator 640 includes the counter 642 and a multiplexer (MUX) 644.

More specifically, the counter 642 is reset in response to the vertical synchronizing signal V_SYNC1 and counts a horizontal synchronizing signal H_SYNC1 to generate the second head switching signal HSW2. The MUX 644 selects and outputs one of the first head switching signal HSW1 and the second head switching signal HSW2 as the head switching signal HSW in response to a predetermined video selection signal Video_SEL. An external video signal other than a video signal recorded in a video tape does not include a head switching signal. Accordingly, the counter 642 generates the second head switching signal HSW2 at a point similar to the point of generation of an actual head switching signal HSW according to a result of counting the horizontal synchronizing signal H_SYNC1. The second head switching signal HSW2 can be generated by inverting a current second head switching signal HSW2 generated 5–6 lines before a succeeding vertical synchronizing signal is applied.

The address translator 620 outputs an address translation signal AD_T for translating the read address R_ADD and a read translation address T_RAD in response to the head switching signal HSW and the write address W_ADD. The configuration and operation of the address translator 620 will be described in more detail below with reference to FIG. 11.

The read address output unit 630 increases the read address R_ADD by one and outputs the increased read address or outputs a read address corresponding to one line before in response to the first comparison signal CT1. The read address output unit 630 also outputs the read translation address T_RAD in response to the address translation signal AD_T. For this operation, the read address output unit 630 includes MUXs 632 and 636, an adder 634 and a F/F 638.

More specifically, the MUX 632 selects and outputs one of the signals −1 H and +1 in response to the first comparison signal CT1 output from the comparator 570. The adder 634 adds the output of the MUX 632 to the read address R_ADD of a previous line and applies the result of the addition to the MUX 636 as a second input signal. The MUX 636 receives the address translation signal AD_T as a selection signal and selects and outputs one of the read translation address T_RAD and the output signal of the adder 634. The F/F 638 outputs the output signal of the MUX 636 as the read address R_ADD in response to the second clock signal CK2.

The dual port memory device 560 can receive the chrominance signal C1, the luminance signal Y1, the horizontal and vertical synchronizing signals H_SYNC1 and V_SYNC1 and a burst signal via an input terminal MIN. These signals may have jitter. Accordingly, signals output via the output terminal MOUT of the dual port memory device 560 may be the jitter-free chrominance signal C2, the jitter-free luminance signal Y2, the jitter-free horizontal and vertical synchronizing signals H_SYNC2 and V_SYNC2 and a jitter-free burst signal.

The generation of the Write address W_ADD will now be described in more detail with reference to FIG. 10. The 1 H signal generator 612 of the write address generator 550 maintains a "high" level output signal in a normal state in which an approach phenomenon between the write address W_ADD and the read address R_ADD does not occur, i.e., the two addresses are spaced apart by a predetermined interval. Accordingly, the write address W_ADD increases by one by the AND gate 614 whenever the write clock signal CK1 is applied. However, when the write address W_ADD approaches the read address R_ADD and thus, the second comparison signal CT2 is enabled, the output of the 1 H signal generator 612 becomes "low". Hence, a current write address W_ADD is maintained for 1 H by the output signal of the AND gate 614. When the output of the 1 H signal generator 612 newly becomes "high", the write address W_ADD increases by one.

The generation of the read address R_ADD will be described in more detail with reference to FIG. 10. When the head switching signal HSW is not generated and the approach phenomenon between the read and write addresses does not occur, the MUX 632 selects the signal +1. Thus, the read address output unit 630 outputs the read address R_ADD increased by one. However, when the head switching signal HSW is generated, the MUX 636 outputs the read translation address T_RAD. The read translation address T_RAD is a result of adding a predetermined offset value to the write address W_ADD. Alternatively, when the read address R_ADD approaches the write address W_ADD, the first comparison signal CT1 is enabled. The MUX 632 outputs the signal −1 H in response to the first comparison signal CT1. Accordingly, the read address R_ADD is set to a value obtained by subtracting 1 H from a current read address.

Figure 11:
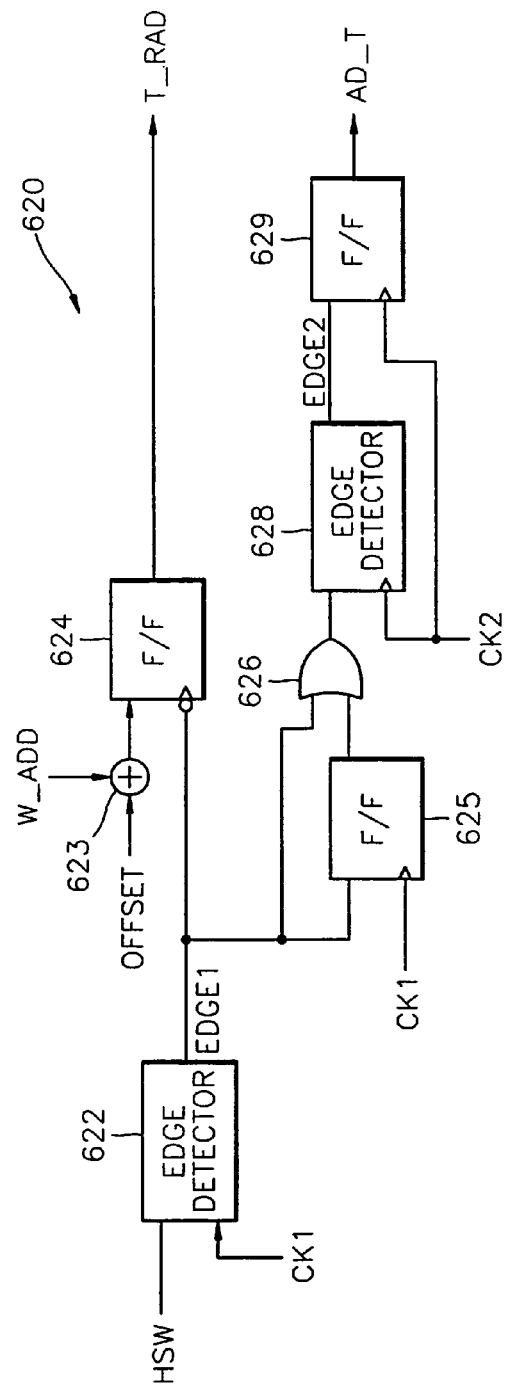
FIG. 11 is a detailed circuit diagram of the address translator of FIG. 10.

FIG. 11 is a detailed circuit diagram of the address translator 620 of FIG. 10. The address translator 620 includes edge detectors 622 and 628, an adder 623, F/Fs 624, 625 and 629 and an OR gate 626.

The edge detector 622 detects an edge of the head switching signal HSW in response to the first clock signal CK1 and outputs the result of the detection as a first edge detection signal EDGE1. The adder 623 adds the predetermined offset value OFFSET to the write address W_ADD and outputs the result of the addition. The offset value OFFSET is preferably set to a value corresponding to the predetermined interval, that is, the 0.5 H. The F/F 624 outputs the output of the adder 623 as the read translation address T_RAD in response to the first edge detection signal EDGE1. The F/F 625 receives the first edge detection signal EDGE1 as input data and provides an output in response to the first clock signal CK1. The OR gate 626 performs an OR operation on the first edge detection signal EDGE1 and the output of the F/F 625 and outputs the result of the OR operation. The output signal of the OR gate 626 is an expanded signal of the first edge detection signal EDGE1. The edge detector 628 detects an edge of the output signal of the OR gate 626 in response to the second clock signal CK2 and outputs the result of the detection as a second edge detection signal EDGE2. The F/F 629 receives the second edge detection signal EDGE2 as input data and provides the address translation signal AD_T in response to the second clock signal CK2.

As described above, the address translator 620 generates the address translation signal AD_T based on the edge component which is detected from the signal obtained by expanding the first edge detection signal EDGE1. In addition, the read translation address T_RAD obtained by adding the offset value OFFSET to the write address W_ADD is output in response to the first edge detection signal EDGE1 so that the interval between the write address W_ADD and the read address R_ADD can be regularly controlled.

Figure 12:
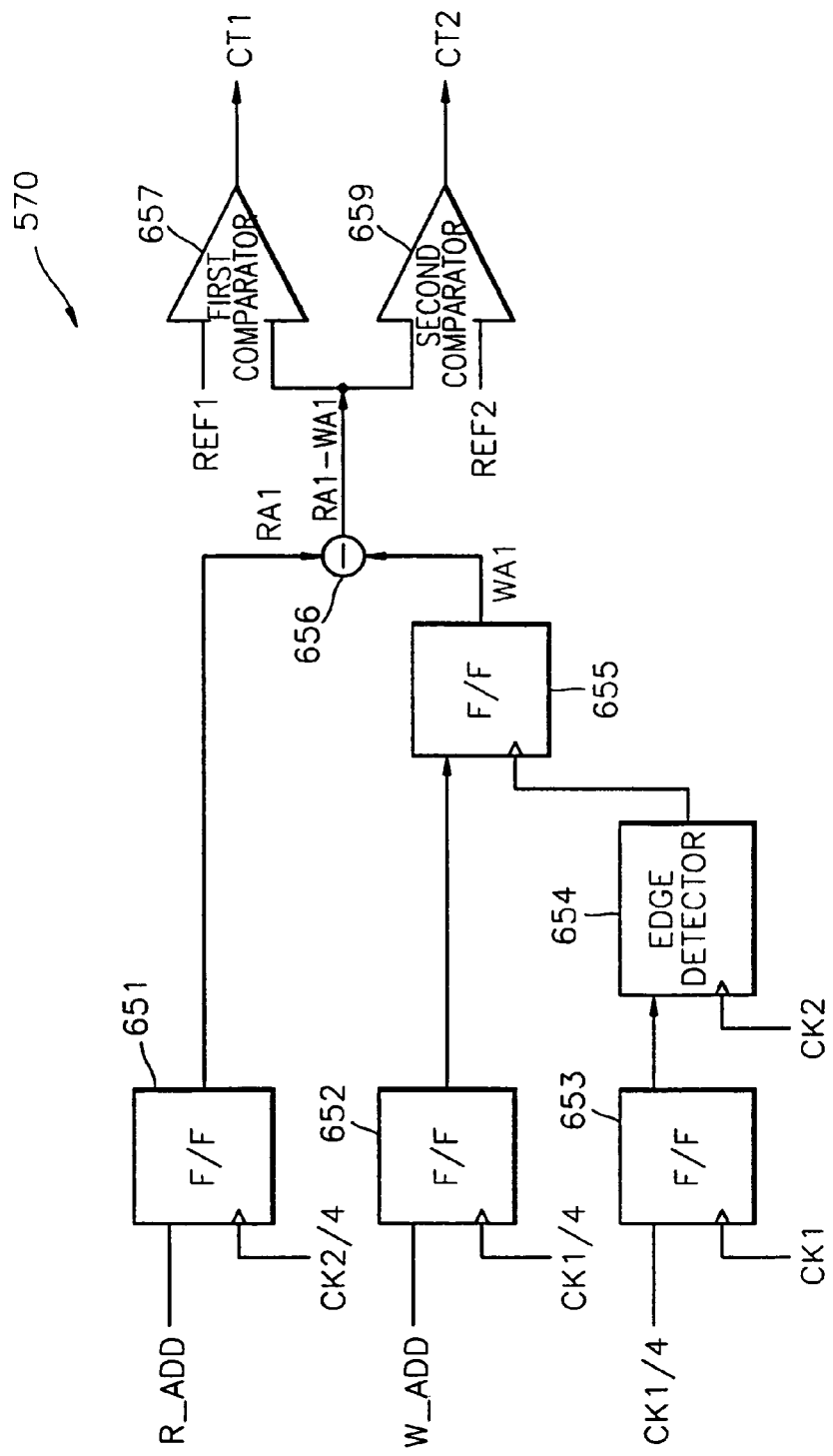
FIG. 12 is a detailed circuit diagram of the comparator of FIG. 10.

FIG. 12 is a detailed circuit diagram of the comparator 570 of FIG. 10. The comparator 570 includes F/Fs 651, 652 and 653, an edge detector 654, a F/F 655, a subtractor 656, a first comparator 657 and a second comparator 659.

The F/F 651 outputs the read address R_ADD in response to a 1/4 second clock signal CK2/4. In other words, an output signal RA1 of the F/F 651 is a read address which is increased by 4 at each cycle of the 1/4 second clock signal CK2/4.

The F/F 652 outputs the write address W_ADD in response to a 1/4 first clock signal CK1/4. In other words, the F/F 652 outputs a write address which is increased by 4 at each cycle of the 1/4 first clock signal CK1/4.

The F/F 653 outputs a 1/4 first clock signal CK1/4 in response to the first clock signal CK1. The output of the F/F 653 is a signal obtained by delaying the 1/4 first clock signal CK1/4 by one cycle of the first clock signal CK1.

The edge detector 654 detects an edge of the output signal of the F/F 653 in response to the second clock signal CK2 and applies the result of the detection to the F/F 655 as a clock signal. The output of the edge detector 654 remains at a "high" level for one cycle of the second clock signal CK2 starting from the rising edge of the output signal of the F/F 653.

The F/F 655 outputs the output signal of the F/F, 652 in response to the output signal of the edge detector 654. The output WA1 of the F/F 655 is a signal obtained by delaying the output signal of the F/F 652 by one cycle of the first clock signal CK1.

The subtractor 656 subtracts the output signal WA1 of the F/F 655 from the output signal RA1 of the F/F 651 and outputs a result of the subtraction. The output signal of the subtractor 656 can be expressed as RA1-WA1.

The first comparator 657 compares the output signal RA1-WA1 of the subtractor 656 with a first reference value REF1 and outputs the result of the comparison as, the first comparison signal CT1. The second comparator 659 compares the output signal RA1-WA1 of the subtractor 656 with a second reference value REF2 and outputs the result of the comparison as the second comparison signal CT2. If it is assumed that the second reference value REF2 is a, the first reference value REF1 is expressed as |−a|. The value a may vary depending on the design of a jitter correcting apparatus and may be a very small positive or negative number.

In an abnormal state in which a video tape is damaged or shocked, two addresses may collide. In other words, in a normal state, content which has been written by the write address W_ADD 1 H before a current write address is read by the read address R_ADD. However, when the write address W_ADD approaches the read address R_ADD, the problem that data of a current line is read by a retarded read address R_ADD may occur. On the other hand, when the read address R_ADD approaches the write address W_ADD, the problem that data of a previous line is repeatedly read by the retarded write address W_ADD may occur. In addition, the dual port memory device 560 is not designed to store enough data for exactly one line but is designed to have a predetermined margin for smooth memory access. Accordingly, when the read address R_ADD approaches the write address W_ADD, instead of the data located at a point accurately 1 H before, the data located before or after the point 1 H, may be repeatedly read. In the above cases when the approach phenomenon between two addresses occurs, the comparator 570 of FIG. 12 controls the interval between the generation of the write address W_ADD and the generation of the read address R_ADD.

The following description concerns the detailed procedure of the generation of the comparison signals by the comparator 570 depicted in FIG. 12. The operation of the comparator 570 when the read address R_ADD approaches the write address W_ADD is as follows. If the output signal RA1-WA1 of the subtractor 656 is a small negative number and is smaller than the first reference value REF1, then the read address R_ADD is approaching the write address W_ADD. Accordingly, in this case, the first comparison signal CT1 is activated to a predetermined level, for example, a "high" level by the first comparator 657.

On the other hand, the operation of the comparator 570 when the write address W_ADD approaches the read address R_ADD is as follows. If the output signal RA1-WA1 of the subtractor 656 is a small positive number and is smaller than the second reference value REF2, the write address W_ADD is approaching the read address R_ADD. Accordingly, in this case, the second comparison signal CT2 is activated by the second comparator 659.

Figure 13A:
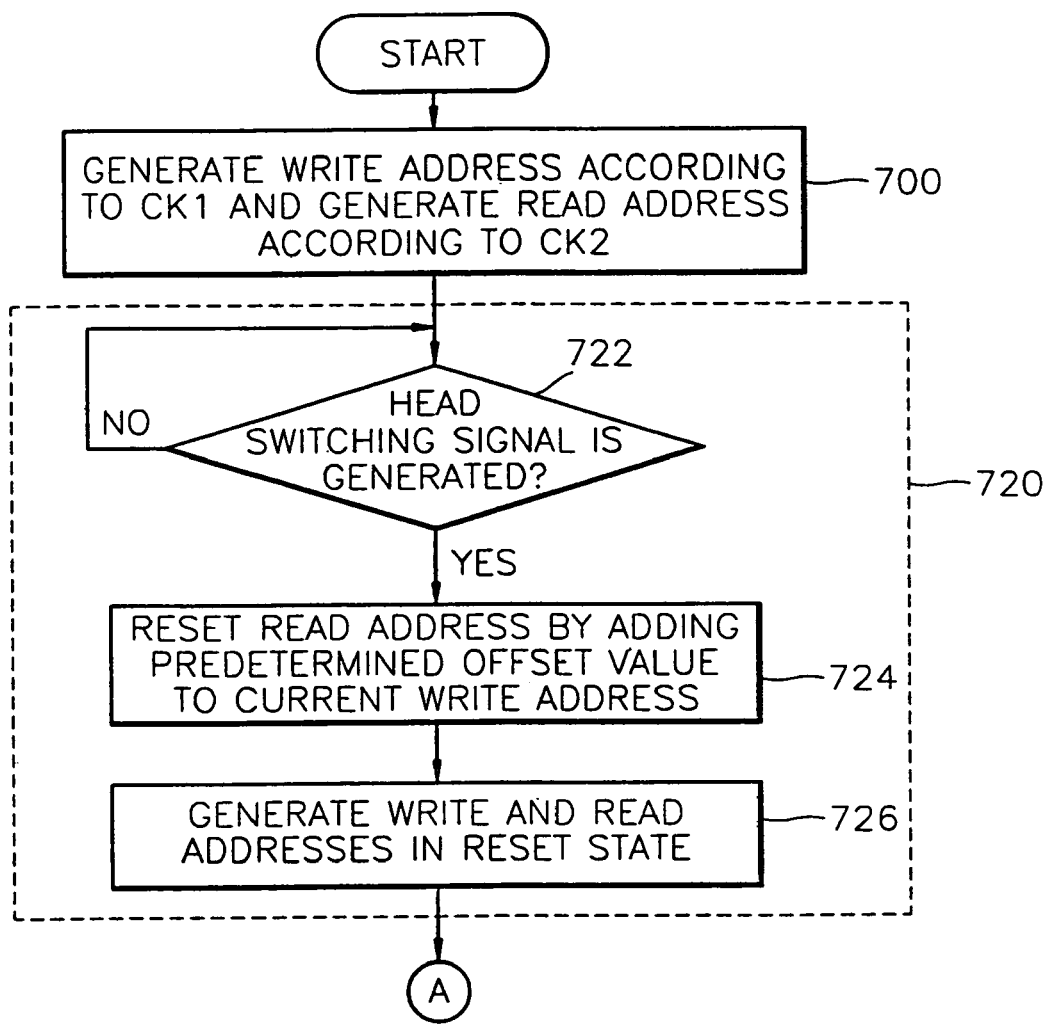

FIGS. 13A and 13B are flowcharts for explaining a jitter correcting method for a video signal according to the present invention. The jitter correcting method includes steps of (700) generating read and write addresses, (720) resetting the address at a head switching point, (740) determining an address approach state and correcting the write/read address, and (760) writing and reading a video signal.

The operation of the jitter correcting apparatus 530 and the jitter correcting method according to the present invention will be described in detail with reference to FIGS. 10 through 13B. The jitter correcting apparatus 530 generates the write address W_ADD according to the first clock signal CK1 generated at an initial operation stage and generates the read address R_ADD according to the second clock signal CK2 in step 700.

Figure 14A:
FIGS. 14A through 14D are diagrams for explaining the normal operation of the apparatus of FIG. 10.
Figure 14B:
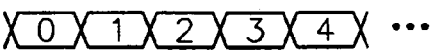
Figure 14C:
Figure 14D:

FIGS. 14A through 14D are waveform diagrams showing the relations between clock signals and addresses in a normal state of operation. FIG. 14A shows the first clock signal CK1. FIG. 14B shows the write address W_ADD. FIG. 14C shows the second clock signal CK2. FIG. 14D shows the read address R_ADD.

The write address W_ADD of FIG. 14B is increased by one in response to the first clock signal CK1 of FIG. 14A. The read address R_ADD of FIG. 14D is increased by one in response to the second clock signal CK2 of FIG. 14C. Since the first clock signal CK1 is synchronized with the input video signal and the PLL 510, and the second clock signal CK2 is an oscillation signal having a fixed frequency, the first clock signal CK1 and the second clock signal CK2 are increased asynchronously. The write address W_ADD and the read address R_ADD are generated at each line such that their interval is maintained at 0.5 lines.

The accumulated errors between read addresses and write addresses which can be caused by frequency errors between first and second clock signals are corrected at the head switching point in step 720. In other words, it is determined whether the head switching signal HSW is generated in step 722. If it is determined that the head switching signal HSW is generated in the step 722, the predetermined offset value OFFSET is added to a current write address W_ADD and the result of the addition is output as a read address, so that the read address R_ADD is reset in step 724. Then, a write address W_ADD and a read address R_ADD are generated in step 726 in the reset state.

Figure 15A:
FIGS. 15A through 15K are waveform diagrams for explaining the operation of the apparatus of FIG. 10 when a head switching signal is generated.
Figure 15B:
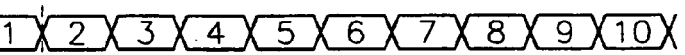
Figure 15C:
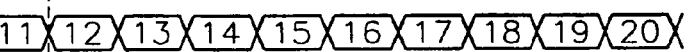
Figure 15D:
Figure 15E:
Figure 15F:
Figure 15G:
Figure 15H:
Figure 15I:
Figure 15J:
Figure 15K:
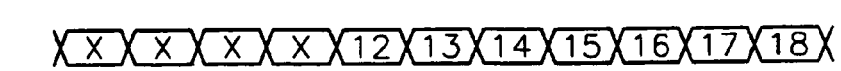

FIGS. 15A through 15K are waveform diagrams for explaining the operation of the apparatus of FIG. 10 when the head switching signal HSW is generated. FIG.15A shows the first clock signal CK1. FIG. 15B shows the write address W_ADD. FIG. 15C shows a write address obtained by adding the offset value to the write address W_ADD of FIG. 15B. FIG. 15D shows the head switching signal HSW. FIG. 15E shows the first edge detection signal EDGE1. FIG. 15F shows the read translation address T_RAD. FIG. 15G shows the output signal of the OR gate 626. FIG. 15H shows the second clock signal CK2. FIG. 15I is the second edge detection signal EDGE2. FIG. 15J shows the address translation signal AD_T. FIG. 15K shows the corrected read address R_ADD.

Once the head switching signal HSW of FIG. 15D is generated by the head switching signal generator 640 and applied to the address translator 620, the edge detector 622 of the address translator 620 detects the edge of the head switching signal HSW. At this time, the write address W_ADD of FIG. 15B appears as shown in FIG. 15C after the addition of the predetermined offset value. The write address of FIG. 15C is applied to the input of the F/F 624. Referring to FIG. 15C, if the offset value is assumed to be 10, the offset value 10 is added to the write address W_ADD. As shown in FIG. 15E, at the point when the edge detection signal EDGE1 falls down to a "low" level after rising up to a "high" level, the output of the F/F 624, that is, the read translation address T_RAD is output. If it is assumed that the write address obtained by the addition of the offset value is 12 at the point when the head switching signal HSW is generated, the read translation address of FIG. 15F has a value 12. The edge detector 628 detects the edge of the output signal of the OR gate 626 in response to the second clock signal CK2 of FIG. 15H and generates the second edge detection signal EDGE2 of FIG. 15I. The F/F 629 outputs the second edge detection signal EDGE2 as the address translation signal AD_T of FIG. 15J in response to the second clock signal CK2. Accordingly, the MUX 636 outputs the read translation address T_RAD to the F/F 638 in response to the address translation signal AD_T applied thereto as a selection signal. Consequently, the read address R_ADD output from the F/F 638 is reset to the value obtained by adding the offset value to the write address W_ADD of FIG. 15B in the step 724. Referring to FIG. 15K, the read address R_ADD is 12 when the head switching address HSW is generated. Thereafter, the read address R_ADD is increased by one in response to the second clock signal CK2. In such a manner, the interval between the write address W_ADD and the read address R_ADD can be initialized when the head switching signal HSW is generated in each field. Then, write and read addresses are generated in the reset state in step 726.

Figure 16:
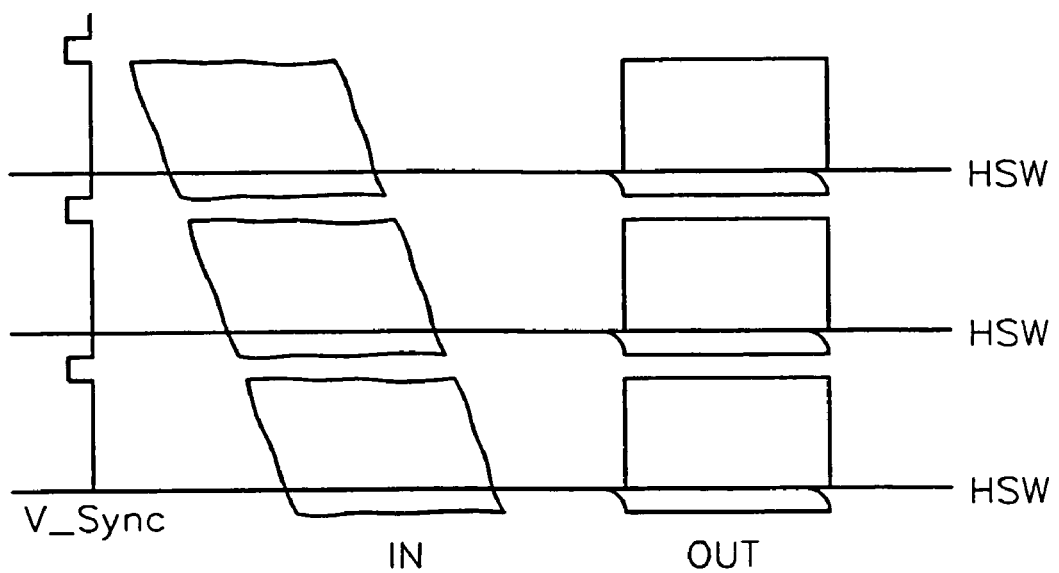
FIG. 16 is a diagram showing an input signal and an output signal when a head switching signal is generated in the apparatus of FIG. 10.

FIG. 16 is a diagram showing the result of jitter correction for a video signal at a head switching point. Referring to FIG. 16, for the video signal MIN, which is input into the dual port memory device 560 of FIG. 10 and has jitters, jitter errors are simultaneously corrected at the time when a head switching signal is generated. Accordingly, the jitters of the video signal MOUT of each field which is output from the dual port memory device 560 can be removed.

Following step 724, the write or read address is corrected according to the approach state between the write address W_ADD and the read address R_ADD in step 740. Primarily, it is determined whether the write address W_ADD approaches the read address R_ADD in step 742. If it is determined that the write address W_ADD approaches the read address R_ADD in the step 742, the current write address W_ADD is maintained without being increased for 1 H in step 744.

FIGS. 17A through 17D are waveform-diagrams for explaining the operation of the apparatus of FIG. 10 when the write address W_ADD approaches the read address R_ADD. FIG. 17A shows the horizontal synchronizing signal H_SYNC1. FIG. 17B shows the second comparison signal CT2. FIG. 17C shows the output of the 1 H signal generator 612 of FIG. 10. FIG. 17D shows a corrected write address.

Referring to FIGS. 17A through 17D, when the write address W_ADD approaches the read address R_ADD, the comparator 570 enables the second comparison signal CT2 of FIG. 17B. At this time, the output signal of the 1 H signal generator 612 of FIG. 17C is at a "low" level for 1 H (T84) according to the second comparison signal CT2. Hence, the write address W_ADD is maintained at a current address for 1 H. Referring to FIG. 17D, it is assumed that the write address immediately before the second comparison signal CT2 is enabled is A4. While the output signal of 17C of the 1 H signal generator 612 is at the "low" level, the write address W_ADD is maintained at A4. Once the output signal of the 1 H signal generator 612 becomes a "high" level, the write address W_ADD increases by one.

As described above, even though the write address W_ADD approaches the read address R_ADD, the phenomenon that data of a current line is read by the read address R_ADD can be prevented.

On the other hand, if it is determined that the write address W_ADD does not approach the read address R_ADD in the step 742, it is determined whether the read address R_ADD approaches the write address W_ADD in step 746. If it is determined that the read address R_ADD approaches the write address W_ADD in the step 746, 1 H is subtracted from the current read address R_ADD in step 748.

FIGS. 18A through 18H are waveform diagrams for explaining the operation of the apparatus of FIG. 10 when the read address approaches the write address. FIG. 18A shows the first clock signal CK1. FIG. 18B shows the write address W_ADD. FIG. 18C shows the 1/4 first clock signal CK1/4. FIG. 18D shows the output of the F/F 655. FIG. 18E shows the second clock signal CK2. FIG. 18F shows the read address R_ADD. FIG. 18G shows the output of the F/F 651. FIG. 18H shows the first comparison signal CT1.

When the read address R_ADD is determined to approach the write address W_ADD, the first comparator 657 of FIG. 12 is driven. Accordingly, the first comparison signal CT1 of FIG. 18H is activated to a "high" level. If the write address has the same value as shown in FIG. 18B, the output of the F/F 655 appears as shown in FIG. 18D according to the 1/4 first clock signal CK1/4 of FIG. 18C. If it is assumed that the second reference value REF2 (FIG. 12), that is, a, is −20, the read address R_ADD of FIG. 18G becomes 0 and the write address W_ADD of FIG. 18D becomes 20 during an interval T80. Accordingly, during the interval T80, the output of the subtractor 656 (FIG. 12) becomes −20. Since this value is smaller than 20, the first comparison signal CT1 is generated at a "high" level. Accordingly, the read address R_ADD is corrected to have a value of exactly 1 H before at a point P2. Referring to FIG. 18F, a read address 1 H before is assumed to be 100.

Consequently, when the read address R_ADD approaches the write address W_ADD, data of one line stored in the dual port memory device 560 is repeatedly read two times by the corrected read address.

Meanwhile, if it is determined that the read address R_ADD does not approach the write address W_ADD in the step 746, the generation interval between the write address W_ADD and the read address R_ADD is normal so that the write address W_ADD and the read address R_ADD are each increased by one in step 750.

Figure 19A:
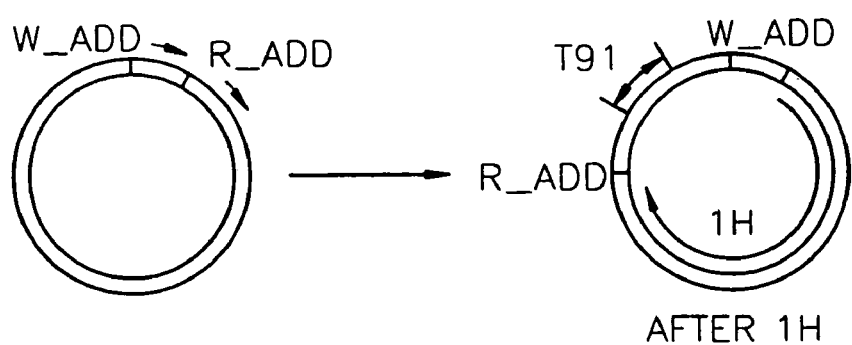
FIGS. 19A and 19B are diagrams showing the results of address control by the apparatus of FIG. 10.
Figure 19B:
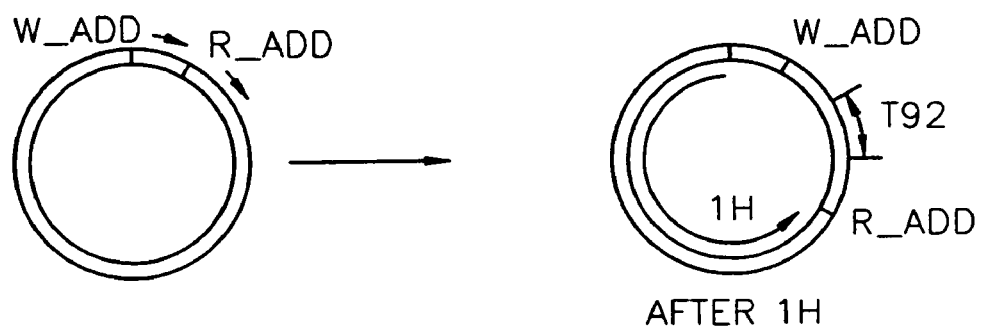

FIGS. 19A and 19B are diagrams for explaining the results of address control by the jitter correcting apparatus 530 of FIG. 10. Referring to FIG. 19A, when the write address W_ADD approaches the read address R_ADD, generation of the write address W_ADD is stopped for a time period of 1 H. Accordingly, after 1 H, only the read address R_ADD is increased. Referring to FIG. 19B, when the read address R_ADD approaches the write address W_ADD, 1 H is subtracted from the read address R_ADD. Accordingly, a read address has a value 1 H before the read address value R_ADD.

In this manner, the correction of an address is carried out when the address approach occurs. Therefore, data is written and read based on the write and read addresses W_ADD and R_ADD, which have undergone the correction step 750, in step 760. When designing a memory such as the dual port memory device 560, for smooth memory access, the size of the memory may be determined to include as much margin as intervals T91 and T92 in addition to the capacity for one line of data. Each of the intervals T91 and T92 varies according to the method by which memory is accessed.

Figure 20:
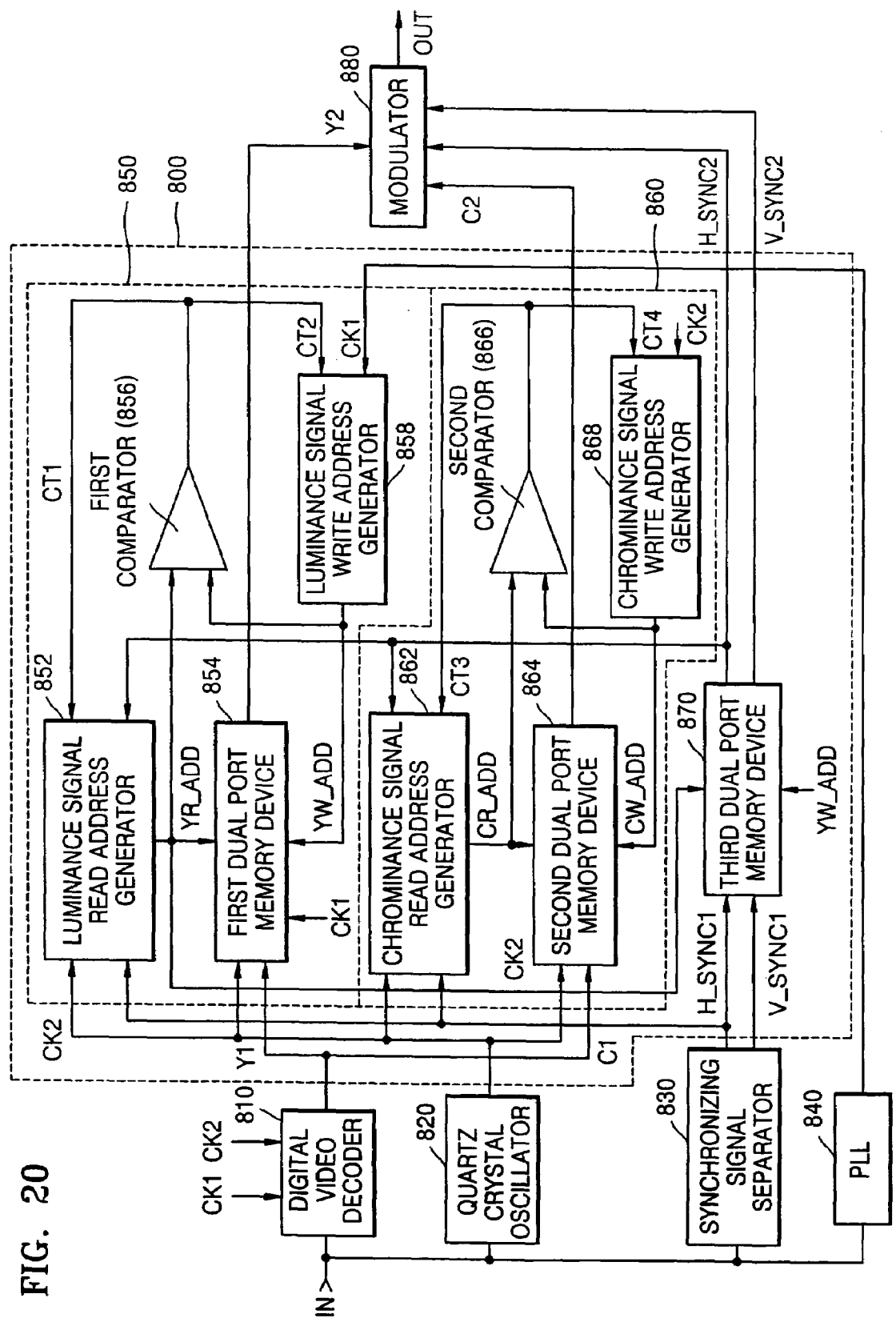
FIG. 20 is a block diagram of a jitter correcting apparatus for a video signal according to another embodiment of the present invention.

The following description concerns a jitter correcting apparatus for a video signal according to another embodiment of the present invention. FIG. 20 is a schematic block diagram of a video signal reproduction system including a jitter correcting apparatus according to an embodiment of the present invention. Referring to FIG. 20, the video signal reproduction system includes a digital video decoder 810, a quartz crystal oscillator 820, a synchronizing signal separator 830, a PLL 840 and a jitter correcting apparatus 800.

The digital video decoder 810 separates a luminance signal Y1 and a chrominance signal C1 from an input video signal IN. The luminance signal Y1 is separated from the video signal in such a manner that it is demodulated by a first clock signal CK1 synchronized with the PLL 840. The chrominance signal C1 is separated from the video signal in such a manner that it is demodulated by a second clock signal CK2 which is generated by the quartz crystal oscillator 820. The synchronizing signal separator 830 and the PLL 840 perform the same functions as those of the corresponding elements in FIG. 8. The quartz crystal oscillator 820 generates the second clock signal CK2 having a fixed frequency. The jitter correcting apparatus 800 includes a luminance signal processor 850, a chrominance signal processor 860 and a dual port memory device 870.

The luminance signal processor 850 generates a luminance signal write address YW_ADD according to the first clock signal CK1 and writes the luminance signal Y1 into a first dual port memory device 854 according to the luminance signal write address YW_ADD. The luminance signal processor 850 also generates a luminance signal read address YR_ADD according to the second clock signal CK2 and reads the written luminance signal according to the luminance signal read address YR_ADD. For such operation, the luminance signal processor 850 includes a luminance signal read address generator 852, a luminance signal write address generator 858, a first dual port memory device 854 and a first comparator 856. The first dual port memory device 854 is implemented by a memory having enough capacity to store one line of luminance signal data. The luminance signal read address generator 852 generates the read address YR_ADD for reading the luminance signal stored in the first dual port memory device 854, in response to the second clock signal CK2 output from the quartz crystal oscillator 820. The generated luminance signal read address YR_ADD can be controlled in response to a first comparison signal CT1 output from the first comparator 856.

The luminance signal write address generator 858 of the luminance signal processor 850 generates the luminance signal write address YW_ADD for writing the luminance signal Y1 into the first dual port memory device 854 in response to the first clock signal CK1. The generated luminance signal write address YW_ADD can be controlled in response to the second comparison signal CT2 output from the first comparator 856. The first comparator 856 compares the luminance signal read address YR_ADD and the luminance signal write address YW_ADD and generates the first and second comparison signals CT1 and CT2 based on a result of the comparison. In other words, the first comparator 856 determines an approach state between the luminance signal write address YW_ADD and the luminance signal read address YR_ADD and generates the first and second comparison signals CT1 and CT2. The first and second comparison signals CT1 and CT2 are used as control signals for correcting the read and write addresses of a luminance signal. Therefore, the luminance signal Y1 written into the first dual port memory device 854 is read in response to the second clock signal CK2 having a fixed frequency. The read luminance signal is defined as a jitter-free second luminance signal Y2.

The luminance signal processor 850 of FIG. 20 can be implemented in a similar manner to the embodiment of FIG. 8, and thus its detailed description will be omitted. As will be described below, in the luminance signal processor 850 in FIG. 20, read and write addresses are reset based on an average of skew of an output video signal of each field at a head switching point.

The chrominance signal processor 860 generates a chrominance signal write address CW_ADD according to the second clock signal CK2 and writes the chrominance signal C1 into a second dual port memory device 864 according to the chrominance signal write address CW_ADD. The chrominance signal processor 860 also generates a chrominance signal read address CR_ADD according to the second clock signal CK2 and reads the written chrominance signal according to the chrominance signal read address CR_ADD. For such operation, the chrominance signal processor 860 includes a chrominance signal read address generator 862, a chrominance signal write address generator 868, the second dual port memory device 864 and a second comparator 866.

The second dual port memory device 864 of the chrominance signal processor 860 is implemented by a memory having enough capacity to store more than one line of chrominance signal. The chrominance signal read address generator 862 generates the read address CR_ADD for reading the written chrominance signal from the second dual port memory device 864 in response to the second clock signal CK2. The chrominance signal read address CR_ADD can be controlled in response to a third comparison signal CT3 output from the second comparator 866. The chrominance signal write address generator 868 generates the chrominance signal write address CW_ADD for writing the chrominance signal C1 in response to the second clock signal CK2. The chrominance signal write address CW_ADD can be controlled in response to a fourth comparison signal CT4 output from the second comparator 866. The second comparator 866 compares the chrominance signal read address CR_ADD and the chrominance signal write address CW_ADD and generates the third and fourth comparison signals CT3 and CT4 based on the result of the comparison. The third and fourth comparison signals CT3 and CT4 are used as control signals for correcting the chrominance signal read and write addresses. Consequently, the chrominance signal C1 which has been written into the second dual port memory device 864 is read in response to the second clock signal CK2. The read chrominance signal is defined as a jitter-free second chrominance signal C2.

The third dual port memory device 870 stores a horizontal synchronizing signal H_SYNC1 and a vertical synchronizing signal V_SYNC1, which are output from the synchronizing signal separator 830, in response to the luminance signal write address YW_ADD. The horizontal and vertical synchronizing signals H_SYNC1 and V_SYNC1 stored in the third dual port memory device 870 are output in response to the luminance signal read address YR_ADD. The output horizontal and vertical synchronizing signals are defined as jitter-free second horizontal and vertical synchronizing signals H_SYNC2 and V_SYNC2. The chrominance signal processor 860 will be described in more detail with reference to FIG. 21.

The modulator 880 receives and modulates the video signal output from the jitter correcting apparatus 800 of FIG. 20, which includes the second luminance signal Y2, the second chrominance signal C2 and the second horizontal and vertical synchronizing signals H_SYNC2 and V_SYNC2.

This embodiment of the present invention demodulates a chrominance signal using a second clock signal CK2 instead of a first clock signal CK1, thereby improving the demodulation characteristics of the chrominance signal. The jitter correcting apparatus 800 of FIG. 20 writes and reads a chrominance signal according to a second clock signal CK2 having a fixed frequency. In this case, the problem that the first clock signal CK1 for writing the luminance signal Y1 does not synchronize with the second clock signal CK2 for writing the chrominance signal C1 may occur. However, this problem can be solved by correcting the jitter of the chrominance signal based on a result of correcting the jitter of the luminance signal. For example, the jitter of the chrominance signal can be corrected using the horizontal synchronizing section of the luminance signal.

Figure 21:
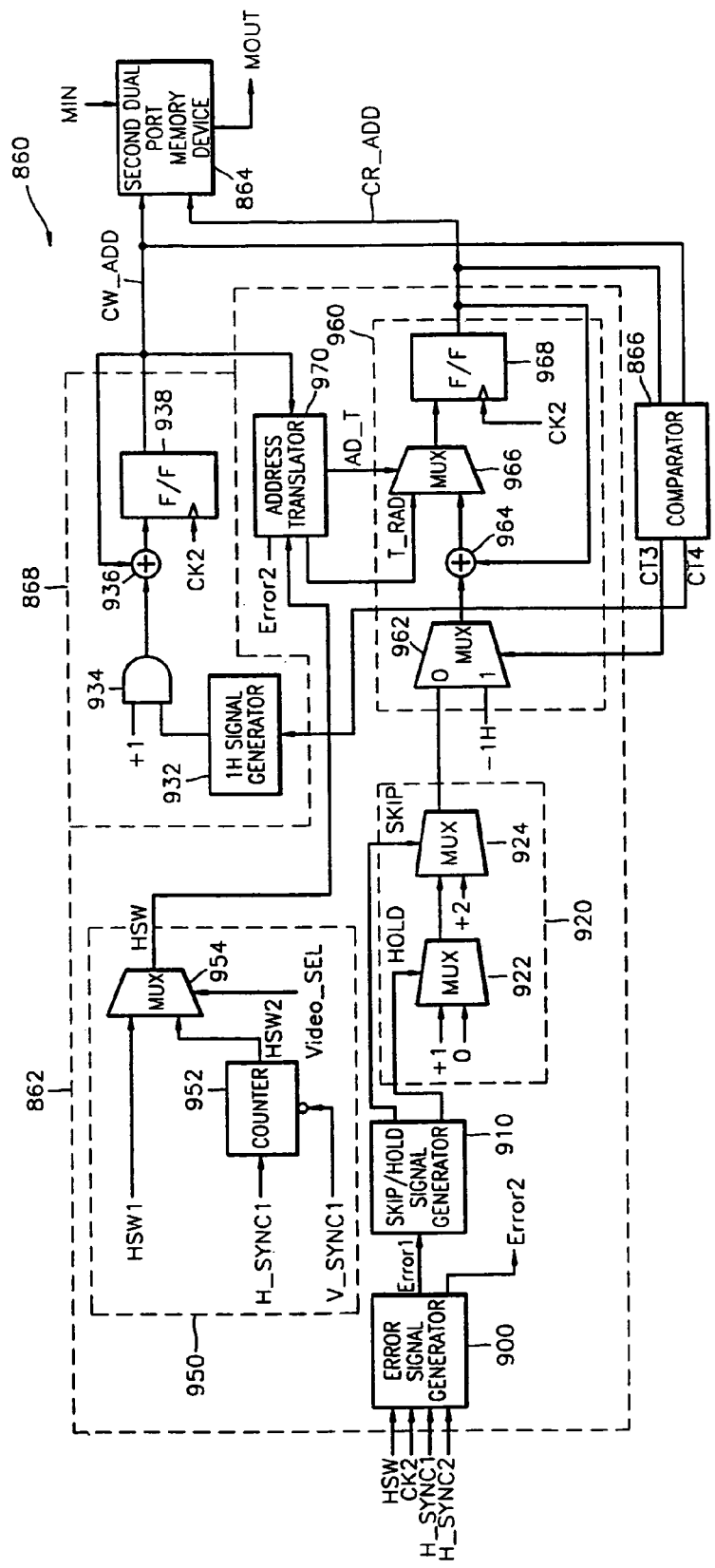
FIG. 21 is a detailed block diagram of the chrominance signal processor of the apparatus of FIG. 20.

FIG. 21 is a detailed block diagram of the chrominance signal processor 860 of the jitter correcting apparatus 800 of FIG. 20. Referring to FIG. 21, the chrominance signal write address generator 868 includes an AND gate 934, a 1 H signal generator 932, an adder 936 and a flip-flop (F/F) 938. The elements of the chrominance signal write address generator 868 perform similar functions to those of the elements of the write address generator 550 of FIG. 10. In the chrominance signal write address generator 868, the 1 H signal generator 932 generates a 1 H signal in response to the fourth comparison signal CT4 output from the second comparator 866.

The chrominance signal read address generator 862 includes an error signal generator 900, a skip/hold signal generator 910, an address controller 920, a head switching signal generator 950, an address translator 970 and a read address output unit 960. The error signal generator 900 generates first and second errors Error 1 and Error2 in response to a head switching signal HSW, the second clock signal CK2 and the first and second horizontal synchronizing signals H_SYNC1 and H_SYNC2. The first error 1 indicates the difference between the first and second horizontal synchronizing signals H_SYNC1 and H_SYNC2 of each horizontal line. In other words, the error signal generator 900 generates an error signal corresponding to the error between the cycle of the first horizontal synchronizing signal H_SYNC1 written into the third dual port memory device 870 of FIG. 20 and the cycle of the second horizontal synchronizing signal H_SYNC2 read from the third dual port memory device 870, that is, Error1. The first error signal Error1 can be defined as a signal for synchronizing the luminance signal written by the first clock signal CK1 with the chrominance signal written by the second clock signal CK2. The second error signal Error2 indicates the average skew of an input video signal of each field. Accordingly, the second error signal Error2 is reflected when resetting the addresses of the chrominance signal and luminance signal at a head switching point. The error signal generator 900 will be described later in more detail with reference to FIGS. 26 through 30.

The skip/hold signal generator 910 generates a hold signal HOLD and a skip signal SKIP for controlling the output of a chrominance signal in response to the first error signal Error1 generated by the error signal generator 900. For example, when the cycle of the first-horizontal synchronizing signal H_SYNC1 is determined to be larger than the cycle of the second horizontal synchronizing signal H_SYNC2 based on the first error signal Error1, a skip signal SKIP is generated to reduce chrominance signal data. On the other hand, when the cycle of the first horizontal synchronizing signal H_SYNC1 is determined to be smaller than the cycle of the second horizontal synchronizing signal H_SYNC2, a hold signal HOLD is generated to increase chrominance signal data.

The address controller 920 skips or holds the read address of a chrominance signal in response to the skip signal SKIP and the hold signal HOLD generated by the skip/hold signal generator 910. For this operation, the address controller 920 includes MUXs 922 and 924. The MUX 922 receives +1 and 0 as first and second inputs and selects and outputs one of the two inputs in response to the hold signal HOLD. For example, the MUX 922 can be implemented such that it outputs 0 when the hold signal HOLD is at a "low" level. In other words, when the output of the MUX 922 is 0, the read address of a chrominance signal is not increased and a current address is maintained. The MUX 924 receives the output of the MUX 922 and +2 as first and second inputs and selects and outputs one of the two inputs in response to the skip signal SKIP. For example, the MUX 924 can be implemented such that it outputs +2 when the skip signal SKIP is at a "low" level. In other words, when the output of the MUX 924 is +2, the read address of a chrominance signal is increased by 2 in a succeeding process. Accordingly, two read addresses of the chrominance signal are skipped over from a current read address.

FIGS. 22A through 22D are diagrams for explaining the correction for a chrominance signal performed by the apparatus of FIG. 21. FIG. 22A shows the chrominance signal C1 to be written. FIG. 22B shows the horizontal synchronizing signal H_SYNC1 to be written. FIG. 22C shows the read chrominance signal C2. FIG. 22D shows the read horizontal synchronizing signal H_SYNC2.

With reference to FIGS. 21 through 22D, a process of correcting a chrominance signal according to the cycle of a horizontal synchronizing signal will now be described in detail. As described above, the apparatus of FIG. 21 uses the second clock signal CK2 generated by the crystal oscillator 820 to write a chrominance signal. It is assumed that the clock frequency of the crystal oscillator 820 is 13.5 MHz. The number of clock cycles shown in FIG. 22B is obtained by counting the cycles of the input horizontal synchronizing signal H_SYNC1 by the second clock signal CK2. Accordingly, the number of cycles of the horizontal synchronizing signal H_SYNC1 which is written in synchronization with the PLL 840 of FIG. 20 may vary when the cycles are counted by the second clock signal CK2. Referring to FIG. 22B, it is assumed that the number of clock cycles counted during an interval T71 is 850, the number of clock cycles counted during an interval T72 is 858, and the number of clock cycles counted during an interval T73 is 866. Since the horizontal synchronizing signal H_SYNC1 is processed together with a luminance signal, the number of clock cycles of the first clock signal CK1 of each horizontal cycle is fixed to 858. However, if an input video signal is longer or shorter than a broadcasting standard, even though the number of clock cycles of the first clock signal CK1 is fixed, the number of clock cycles of the second clock signal CK2 may not be 858. If the interval T72, in which the counted number of clock cycles of the second clock signal CK2 is 858, corresponds to a normal case, the interval T71 indicates a case in which the horizontal cycle of an input video signal is shorter than the standard. During the interval T71, the counted number of clock cycles of the second clock signal CK2 is 850 and is 8 pieces of data short in comparison with the reference number 858. In this case, the apparatus of FIG. 21 performs a process such that the input chrominance signal C1 is increased by 8 pieces of data. The interval T73 indicates a case in which the horizontal cycle of an input video signal is longer than the standard. During the interval T73, the counted number of clock cycles of the second clock signal CK2 is 866 and is 8 pieces of data more than the reference number 858. Accordingly, the apparatus of FIG. 21 performs a process such that the input chrominance signal C1 is decreased by 8 pieces of data.

In other words, the digital video decoder 810 of FIG. 20 samples a chrominance signal according to the second clock signal CK2 having a fixed frequency, which is input during data demodulation. To compensate for jitter in the chrominance signal, the number of chrominance signal data elements is fixed to 858. Therefore, the number of output data elements of the chrominance signal may be increased or decreased in accordance with the difference between the measured value of the cycle of an input horizontal synchronizing signal H_SYNC1 and a reference value. To increase the number of output data elements of the chrominance signal, higher-order interpolation can be used. On the other hand, to decrease the output data of the chrominance signal, decimation can be used.

FIGS. 23A through 23D are diagrams showing a method for correcting chrominance signal data according to the cycle of an input horizontal synchronizing signal H_SYNC1. FIG. 23A shows a case in which the number of chrominance signal data elements is one less or more than a reference value. FIG. 23B shows a case in which the number of chrominance signal data elements is two less or more than the reference value. FIG. 23C shows a case in which the number of chrominance signal data elements is three less or more than the reference value. FIG. 23D shows a case in which the number of chrominance signal data elements is four less or more than the reference value.

If the number of data of a chrominance signal to be increased or decreased is determined as shown in FIGS. 22A through 22D, the number of chrominance signal data is increased or decreased at each appropriated position, that is, at each position designated by an arrow as shown in FIGS. 23A through 23D. Consequently, the total number of output data elements is 858. Each arrow shown in FIGS. 23A through 23D indicates an appropriate position for compensation of the chrominance signal data to be output. In this case, the characteristic of a chrominance signal is used. More specifically, since the frequency component of a chrominance signal is very low, even though some data is discarded or repeated, this is not easily detected. The increase or decrease of chrominance signal data can be performed by the address controller 920 of FIG. 21 correcting the read address CR_ADD of a chrominance signal.

Referring back to FIG. 21, the head switching signal generator 950 includes a counter 952 and a MUX 954. The head switching signal generator 950 performs the same functions as those of the head switching signal generator 640 of FIG. 10, and thus a detailed description thereof will be omitted.

The address translator 970 generates an address translation signal AD_T and a read translation address T_RAD in response to the head switching signal HSW output from the head switching signal generator 950, the chrominance signal write address CW_ADD, and the second error signal Error2 generated by the error signal generator 900. The read translation address T_RAD generated by the address translator 970 is a value obtained by adding the second error signal Error2 to the chrominance signal write address CW_ADD. The address translator 970 will later be described in further detail with reference to FIG. 31.

The read address output unit 960 selects one of the output signal of the address controller 920 and a value −1 H in response to the third comparison signal CT3. The read address output unit 960 also outputs the read translation address T_RAD at a head switching point in response to the address translation signal AD_T. For this operation, the read address output unit 960 includes MUXs 962 and 966, an adder 964 and a F/F 968.

The comparator 866 can be implemented in the same manner as the comparator 570 of FIG. 12. Thus, a detailed description thereof will be omitted.

The input signal MIN of the second dual port memory device 864 may comprise the jittered chrominance signal C1. The output signal MOUT of the second dual port memory device 864 may comprise the jitter-free chrominance signal C2.

The address translator 970 of FIG. 21 can also be applied to the luminance signal read address generator 852 of FIG. 20 in the same manner. In other words, the second error signal Error2 generated by the error signal generator 900 is added to the luminance signal read address YR_ADD and the chrominance signal read address CR_ADD, respectively, at the head switching point, thereby changing respective read addresses. If the second error signal Error2, that is, an average skew of each field of a video signal, is not reflected at the head switching point, horizontal skew may appear on a resultant screen of video output.

FIGS. 24A through 24D are diagrams for explaining a case in which the jitter of each field of a video signal is corrected in a state in which the second error signal Error2 is not reflected. FIG. 24A shows fields of the video signal which is input on the basis of absolute time. FIG. 24B shows the fields of the video signal in which jitter is corrected. FIG. 24C shows pictures appearing as a result of displaying the jitter corrected video signal on a video output device. FIG. 24D shows a picture which is formed by overlapping the pictures of respective fields shown in FIG. 24C and thus is actually shown to a user.

Referring to FIGS. 24A through 24D, jitter is corrected based on the difference between an input horizontal synchronizing signal H_SYNC1 and an output horizontal synchronizing signal H_SYNC2 in each field. The result of the jitter correction is shown in FIG. 24B. A jitter corrected output horizontal synchronizing signal H_SYNC2 is set to the horizontal synchronizing signal H_SYNC1 of a video signal which was input last in the previous field. Accordingly, the differences hg1 through hg7 between last output horizontal synchronizing signals of previous fields and input synchronizing signals of current fields appear in a video signal, respectively, in FIG. 24B. As a result, skew may appear at the ends of a field at which the output synchronizing signal H_SYNC2 rapidly varies, such as J1 and J2 of FIG. 24D, in a horizontal direction. To prevent this phenomenon, this embodiment of the present invention adjusts the position of a jitter corrected output video signal according to the amount of skew of an input signal.

Figures 25A, 25B, 25C, 25D:
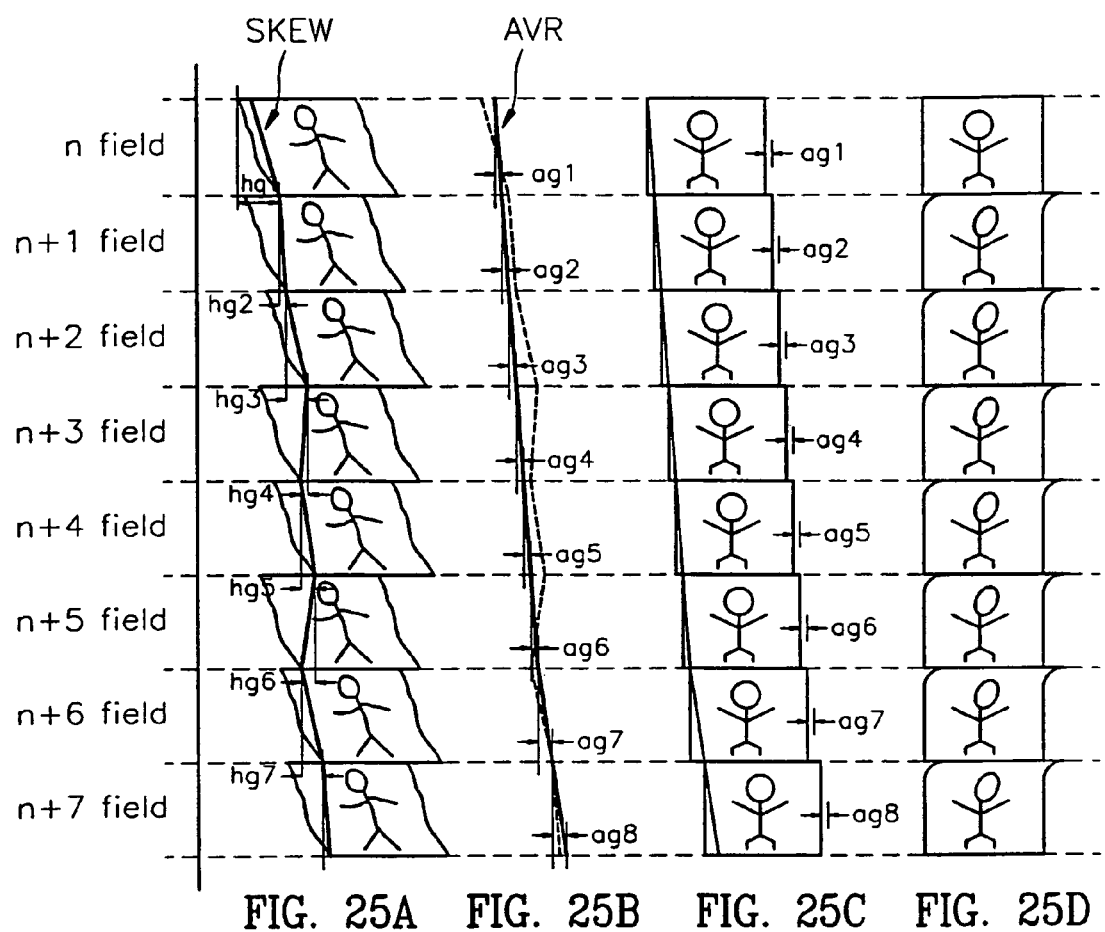

FIGS. 25A through 25D are diagrams showing the results of jitter correction for a video signal according to the present invention. FIG. 25A shows fields of a video signal input on the basis of absolute time. FIG. 25B shows results of calculating the average amount of skew for each field of the video signal of FIG. 25A. FIG. 25C shows results of correcting jitter of each field of the video signal based on the calculated average amount of skew of FIG. 25B. FIG. 25D shows pictures appearing as a result of displaying the jitter corrected video signal on a video output device.

The values ag1 through ag8 of FIG. 25B are the averages, respectively, of the actual amounts hg1 through hg8 of skew of FIG. 25A, and each of the values ag1 through ag8 corresponds to the second error signal Error2. As shown in FIG. 25B, the variation of the average calculated in each field is very small in comparison with the skew of an input signal. When the jitter of a video signal is corrected based on the average whenever a head switching signal is generated, a result appears as shown in FIG. 25C. Output pictures can follow input pictures according to the averages AVR ag1 through ag8. Consequently, in each actual picture of FIG. 25D, the amount of skew is reduced and the direction of skew is fixed to one direction.

Figure 26:
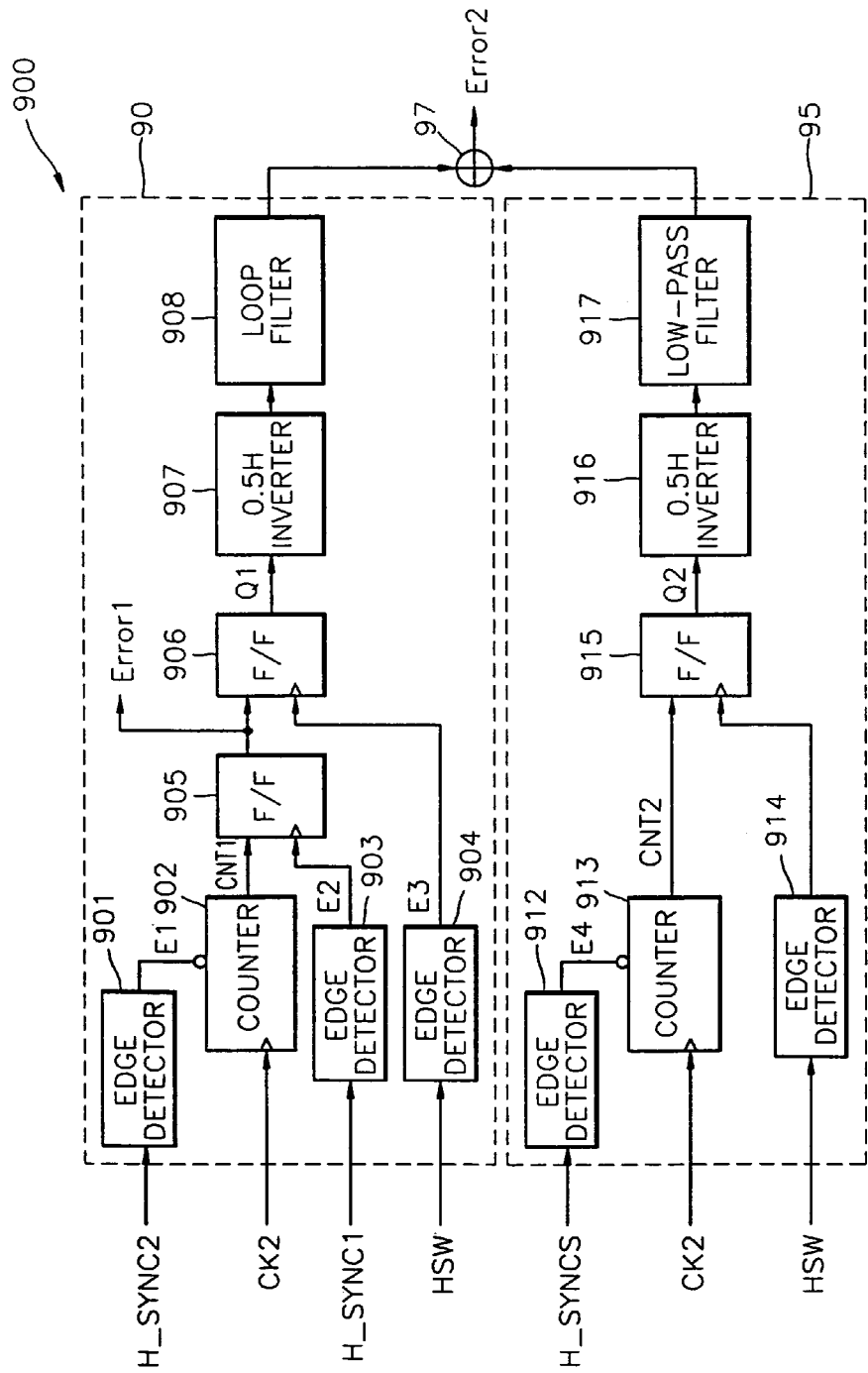
FIG. 26 is a block diagram of the error signal generator of the apparatus of FIG. 21.

FIG. 26 is a detailed block diagram of the error signal generator 900 of the apparatus of FIG. 21. The error signal generator 900 includes an input/output synchronization difference detector 90, a skew average generator 95 and an adder 97.

The input/output synchronization difference detector 90 compares the first horizontal synchronizing signal H_SYNC1 with the second horizontal synchronizing signal H_SYNC2 and generates the difference between them as the first error signal Error1. The input/output synchronization difference detector 90 outputs the first error signal Error1 at the head switching point. Simultaneously, the difference between the two first and second horizontal synchronizing signal H_SYNC1 and H_SYNC2 is 0.5 H-inverted and loop-filtered. For this operation, the input/output synchronization difference detector 90 includes edge detectors 901, 903 and 904, a counter 902, F/Fs 905 and 906, a 0.5 H inverter 907 and a loop filter 908.

The edge detector 901 detects the edge of the second horizontal synchronizing signal H_SYNC2 output from the third dual port memory device 870 and outputs a detected result E1. The counter 902 is reset in response to the output signal E1 of the edge detector 901 and counts the second clock signal CK2. A counted result is represented by CNT1. The edge detector 903 detects the edge of the first horizontal synchronizing signal H_SYNC1 and outputs a detected result E2. The edge detector 904 detects the edge of the head switching signal HSW and outputs a detected result E3. The F/F receives the output signal CNT1 of the counter 902 as data input and the output signal E2 of the edge detector 903 as clock input and generates an output signal. The output signal of the F/F 905 is the first error signal Error1 and is applied to the skip/hold signal generator 910 of FIG. 21 as an input signal. The F/F 906 receives the first error signal Error1 as data input and the output signal E3 of the edge detector 904 as clock input and generates an output signal Q1. The 0.5 H inverter 907 0.5 H-inverts the output signal Q1 of the F/F 906 to generate an output signal having a positive or negative polarity. The loop filter 908 filters the output signal of the 0.5 H inverter 907 to remove a high frequency component. The loop filter 908 is controlled by its own feedback characteristic such that the output value of the loop filter 908 is 0. The resulting output from the loop filter 908 is reflected to the input first horizontal synchronizing signal H_SYNC1 so that the difference between the input first horizontal synchronizing signal H_SYNC1 and the output second horizontal synchronizing signal H_SYNC2 can be gradually reduced.

The skew average generator 95 calculates the average amount of skew of an output picture of each field in response to the head switching signal HSW. The calculated skew average is 0.5 H-inverted and low-pass filtered. For this operation, the skew average generator 95 includes edge detectors 912 and 914, a counter 913, a F/F 915, a 0.5 H inverter and a low-pass filter 917.

The edge detector 912 detects the first horizontal synchronizing signal H_SYNCS which is synchronized with the head switching signal HSW, and outputs a detected result E4. The counter 913 is reset in response to the output signal E4 of the edge detector 912. The counter 913 counts the second clock signal CK2 and outputs a counted result CNT2. The edge detector 914 detects the edge of the head switching signal HSW and outputs a detected result. The F/F 915 receives the output signal CNT2 of the counter 913 as data input and the output signal of the edge detector 914 as clock input and generates an output signal Q2. The 0.5 H inverter 916 0.5 H-inverts the output signal Q2 of the F/F 915 and generates an inverted result as an output signal having a positive or negative polarity. The low-pass filter 917 filters the output signal of the 0.5 H inverter 916 and outputs a filtered result.

The adder 97 sums the output signal of the input/output synchronization difference detector 90 and the output signal of the skew average generator 95 and outputs a summed result as the second error Error2. The second error Error2 is represented by each of ag1 through ag8 in FIG. 25.

FIGS. 27A through 27H are diagrams for explaining the procedure of obtaining the input/output synchronization difference by the error signal generator 900 of FIG. 26. FIG. 27A shows the second clock signal CK2. FIG. 27B shows the second horizontal synchronizing signal H_SYNC2. FIGS. 27C and 27D show the output signal E1 of the edge detector 901 and the output signal CNT1 of the counter 902, respectively. FIG. 27E shows the first horizontal synchronizing signal H_SYNC1. FIGS. 27F and 27G show the output signal E2 of the edge detector 903 and the output signal Error1 of the F/F 905, respectively.

With reference to FIGS. 26 through 27G, the procedure of obtaining the difference between the input and output horizontal synchronizing signals H_SYNC1 and H_SYNC2 using the error signal generator 900 will now be described in detail. The edge detector 901 of FIG. 26 generates the detection signal E1 obtained from the edge detection performed with respect to the second horizontal synchronizing signal H_SYNC2, as shown in FIG. 27C. As shown in FIG. 27D, the counter 902 is reset in response to the output signal E1 of the edge detector 901 and then starts to count the second clock signal CK2. For example, if it is assumed that the second clock signal CK2 has a frequency of 14.3 MHz, the counter 902 sequentially counts from 0 through 909 in a normal state. The edge detector 903 outputs the detection signal E2 obtained from the edge detection performed with respect to the first horizontal synchronizing signal H_SYNC1 of FIG. 27E, as shown in FIG. 27F. The output signal CNT1 of the counter 902 is latched by the F/F 905 at the edge (E2) of the first horizontal synchronizing signal H_SYNC1. The output signal Error1 of the F/F 905 indicates the difference between the first horizontal synchronizing signal H_SYNC1 and the second horizontal synchronizing signal H_SYNC2 in each line as in FIG. 27G. Referring to FIG. 27G, the value of the signal CNT1, which is latched at the edge of the first horizontal synchronizing signal H_SYNC1 detected by the edge detector 903, is generated as the output of the F/F 905.

FIGS. 28A through 28D are diagrams for explaining the procedure of obtaining the input/output synchronization difference at the time when the head switching signal HSW is generated in the apparatus of FIG. 26. FIG. 28A shows the output signal Error1 of the F/F 905 of the input/output synchronization difference detector 90. FIG. 28B shows the head switching signal HSW. FIG. 28C shows the output signal E3 of the edge detector 904. FIG. 28D shows the output signal Q1 of the F/F 906.

As shown in FIG. 28A, the differences between input and output synchronizing signals in every line, that is, the outputs of the F/F 905 are assumed to be f0, f1, f2 and so on. If the head switching signal HSW is, as shown in FIG. 28B, generated for each field, edges (E3) of the head switching signal HSW are detected as shown in FIG. 28C. The output signal Q1 of the F/F 906 corresponds to the output signal Error1 of the F/F 905 appearing whenever an edge of the head switching signal HSW is detected. Among the differences between input and output synchronizing signals as shown in FIG. 28A, values at head switching points, that is, values of the signal shown in FIG. 28D, are needed for determining the actual amount of skew. Consequently, the output signal of the input/output synchronization difference detector 90 corresponds to the value of the difference between the input first horizontal synchronizing signal H_SYNC1 and the output second horizontal synchronizing signal H_SYNC2, which appears at a head switching point. The value of the difference between the input and output synchronizing signals is inverted by 0.5 lines before being output.

FIGS. 29A and 29B are diagrams for explaining the relations between the phase of the first horizontal synchronizing signal H_SYNC1 and the phase of the second horizontal synchronizing signal H_SYNC2. FIG. 29A shows a case in which the first horizontal synchronizing signal H_SYNC1 exits before a point corresponding to 0.5 H of one horizontal synchronizing section 1 H in the second horizontal synchronizing signal H_SYNC2. In this case, the difference T97 between the first and second horizontal synchronizing signals H_SYNC1 and H_SYNC2 is set to have a positive value. On the other hand, FIG. 29B shows a case in which the first horizontal synchronizing signal H_SYNC1 exits after a point corresponding to 0.5 H of one horizontal synchronizing section 1 H in the second horizontal synchronizing signal H_SYNC2. In this case, the difference T98 between the first and second horizontal synchronizing signals H_SYNC1 and H_SYNC2 is set to have a negative value. As described above, the sign of an input/output synchronization difference can be appropriately set according to the relation between the phase of an input synchronizing signal and the phase of an output synchronizing signal as shown in FIGS. 29A and 29B. Therefore, the output synchronizing signal can rapidly follow the input synchronizing signal by adjusting the number of data of a video signal to be output on the basis of a value corresponding to the 0.5 H point of the second horizontal synchronizing signal H_SYNC2.

FIGS. 30A through 30D are waveform diagrams for explaining the operation of the skew average generator 95 in the apparatus of FIG. 26. FIG. 30A shows the head switching signal HSW. FIG. 30B shows the input first horizontal synchronizing signal H_SYNC1. FIG. 30C shows the output signal CNT2 of the counter 913. FIG. 30D shows the output signal Q2 of the F/F 915.

With reference to FIGS. 26 through 30D, the operation of the skew average generator 95 will now be described in detail. The edge detector 912 detects an edge, which is synchronized with the head switching signal HSW of FIG. 30A, among the edges of the first horizontal synchronizing signal H_SYNC1 of FIG. 30B. The counter 913 is reset by a first horizontal synchronizing signal H_SYNCS, which is synchronized with the head switching signal HSW, and counts the second clock signal CK2. Counted results appear as shown in FIG. 30C. It can be seen that the values from 0 through 909 are repeatedly counted. The F/F 915 outputs the output value of the counter 913 when the edge of the head switching signal HSW is detected, as shown in FIG. 30D. In other words, the output signal Q2 of the F/F 915 indicates how much the first horizontal synchronizing signal H_SYNC1 deviates from the second horizontal synchronizing signal H_SYNC2, that is, skew in each field. The output value Q2 of the F/F 915 is inverted by the 0.5 H inverter 916 and output as a positive value or a negative value. The inverted value is filtered by the low-pass filter 917, and thus is output as a signal without a high frequency component.

As described above, the output of the loop filter 908 and the output of the low-pass filter 917 are added by the adder 97 and generated as the second error signal Error2. Accordingly, the second error signal Error2 indicates how much an output synchronizing signal must be adjusted when the head switching signal HSW is applied to the error signal generator 900, that is, each of the values ag1 through ag8 of FIG. 25B. The second error signal Error2 is applied to the luminance signal read address generator 852 and to the chrominance signal read address generator 862.

Figure 31:
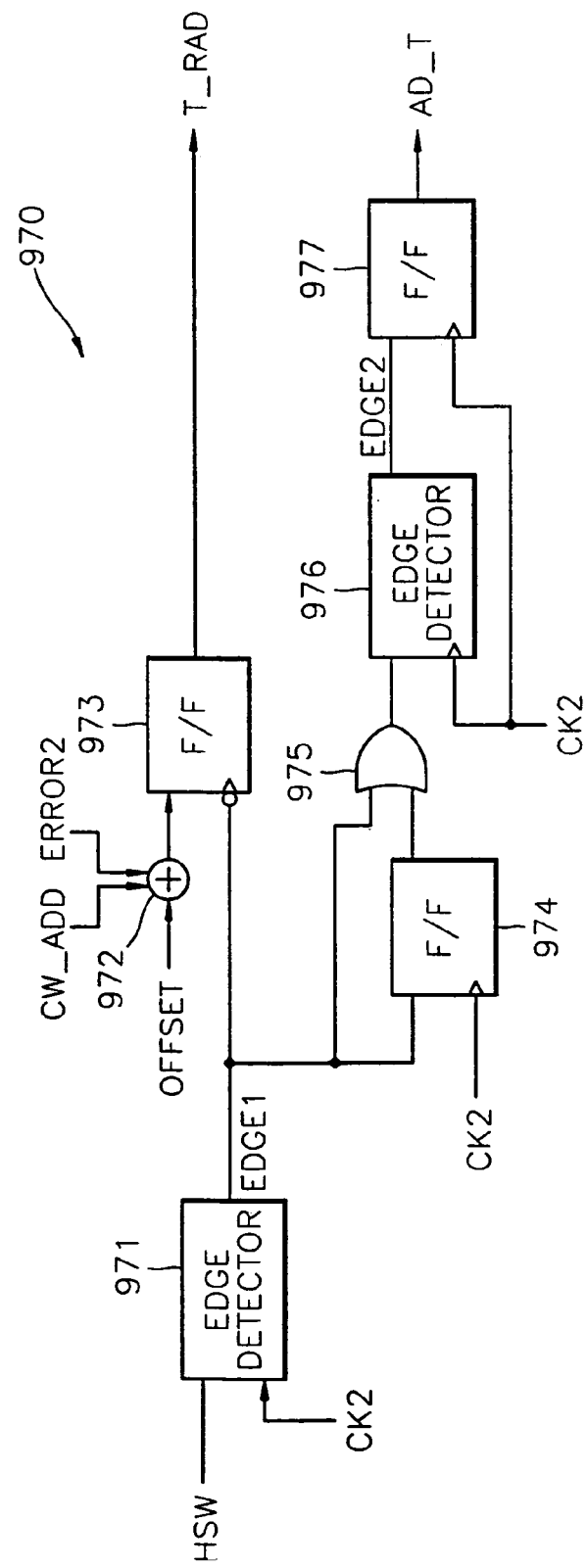
FIG. 31 is a detailed circuit diagram of the address translator of the chrominance signal processor depicted in FIG. 21.

FIG. 31 is a detailed circuit diagram of the address translator 970 of FIG. 21. The address translator 970 includes an edge detector 971, an adder 972, F/Fs 973 and 974, an OR gate 975, an edge detector 976 and a F/F 977.

The elements of the address translator 970 are the same as the elements of the address translator 620 of FIG. 11, and thus detailed descriptions thereof will be omitted. In the address translator 970, the adder 972 adds the chrominance signal write address CW_ADD, an offset value OFFSET, and the second error Error2 and applies a result of the addition to the F/F 973 as data input. The offset value OFFSET is preferably set to 1 H to maintain an appropriate interval between the chrominance signal write address CW_ADD and the chrominance signal read address CR_ADD. As in the example described before, if the second clock signal CK2 is 1.43 MHz, the offset value OFFSET may be 910 which is a value corresponding to 1 H. Accordingly, the read translation address T_RAD obtained by adding the chrominance signal write address CW_ADD, the offset value OFFSET and the second error signal Error2 is the chrominance signal read address CR_ADD at a head switching point.

When the address translator 970 is adapted to the luminance signal processor 850 of FIG. 20, the first clock signal CK1 is used as a write clock signal and the second clock signal CK2 is used as a read clock signal. The second error signal Error2 is applied to an address translator (not shown) of the luminance signal read address generator 852 in the same manner, and thus the luminance signal read address YR_ADD is generated.

Comparators 856 and 866 of the apparatus of FIG. 20 can be implemented in the same manner as in the comparator 570 of FIG. 12, and thus detailed descriptions thereof will be omitted. The exception is that the second clock signal CK2 is used as a write clock signal when a comparator is adapted to the chrominance signal processor 860.

Figure 32A:
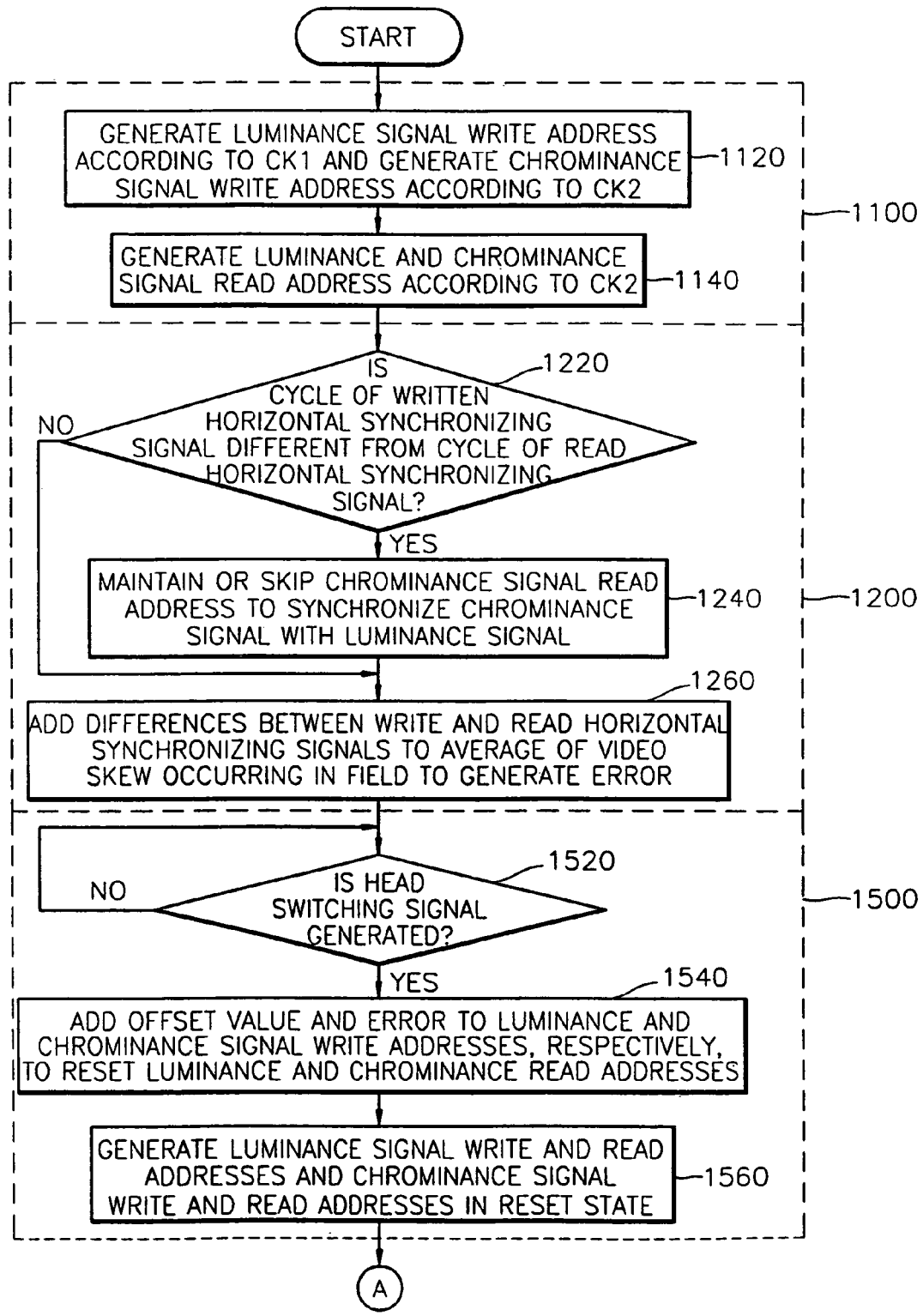
FIGS. 32A and 32B are flowcharts for explaining a jitter correction method for a video signal according to another embodiment of the present invention.
Figure 32B:
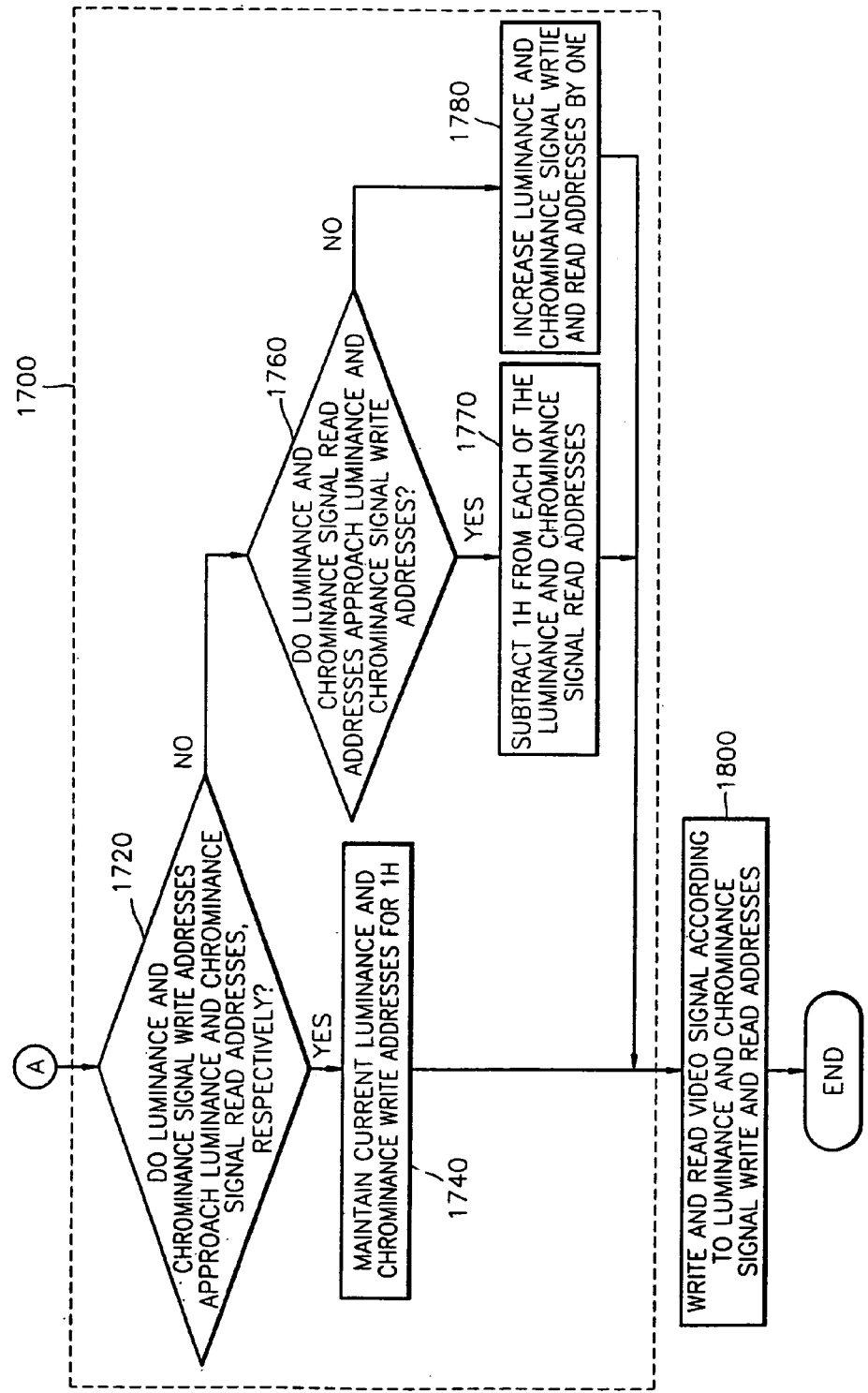

FIGS. 32A and 32B are flowcharts for explaining a jitter correcting method performed by the jitter correcting apparatus depicted in FIG. 20. The jitter correcting method includes the steps of (1100) generating initial addresses, (1200) correcting the cycle of a chrominance signal and generating skew of write and read images, (1500) resetting addresses at a head switching point, (1700) correcting an address according to an address approach state, and (1800) writing and reading a video signal based on generated addresses.

With reference to FIGS. 20 through 32B, the jitter correcting method for a video signal according to the second embodiment of the present invention will now be described. In an initial stage, luminance and chrominance signal write addresses and luminance and chrominance signal read addresses are generated in step 1100. As described above, the luminance signal write address YW_ADD is generated according to the first clock signal CK1 generated by the PLL 840 of FIG. 20, and the chrominance signal write address CW_ADD is generated according to the second clock signal CK2 having the fixed frequency, in step 1120. The luminance signal read address YR_ADD and the chrominance signal read address CR_ADD are generated according to the second clock signal CK2 in step 1140. In other words, in the present invention, a chrominance signal is written according to the fixed quartz crystal oscillation clock signal CK2 so that colors can be faithfully reproduced. In this case, since the write clock signal for a luminance signal is different from the write clock signal for a chrominance signal, the luminance signal may not be synchronized with the chrominance signal. To solve this problem, the horizontal cycle of a video signal is corrected and the amount of skew of the video signal occurring in each field is obtained in step 1200. For these purposes, the cycle of a horizontal synchronizing signal which is processed together with the luminance signal is considered, and the number of output data of the chrominance signal is adjusted. More specifically, it is determined whether the cycle of the horizontal synchronizing signal H_SYNC1 written into the dual port memory device 870 is different from the cycle of the horizontal synchronizing signal H_SYNC2 read from the dual port memory device 870 at each line in step 1220. If it is determined that they are different, a current chrominance signal read address is maintained or skipped such that the chrominance signal is synchronized with the luminance signal in step 1240. The method of correcting a chrominance signal read address has been described in detail with reference to FIGS. 21 through 22D, and thus a detailed description thereof will be omitted. To synchronize the chrominance signal with the luminance signal, the number of output chrominance signal data elements is adjusted.

The differences between the written horizontal synchronizing signal and the read horizontal synchronizing signal at every line in a field are added to an average of video skew occurring in the field to generate the second error signal Error2 in step 1260. The second error signal Error2 is reflected at a head switching point, and thus addresses for the luminance and chrominance signals are reset in step 1500. It is determined whether the head switching signal HSW is generated in step 1520. If the head switching signal HSW is generated in the step 1520, the offset value OFFSET and the second error signal Error2 obtained in the step 1260 are added to the luminance signal write address YW_ADD and to the chrominance signal write address CW_ADD obtained in the step 1100, and thus the luminance and chrominance signal read addresses YR_ADD and CR_ADD are reset in step 1540. Accordingly, the interval between a write address and a read address is regularly maintained at a head switching point which is not perceived by users. Then, luminance signal write and read addresses and chrominance signal write and read addresses are generated in the reset state in step 1560. As described above, it is preferable that the offset value OFFSET indicating a regular interval is set to 1 H. For each of the luminance and chrominance signals, the read address is reset through reflection of the average skew occurring in each field while the regular interval between the write and read addresses is maintained.

After the step 1500, it is determined whether an approach phenomenon occurs between the write address and the read address for each of the luminance and chrominance signals, and the addresses are corrected according to a determined result in step 1700. Primarily, if it is determined that the luminance signal write address YW_ADD and the chrominance write address CW_ADD approach the luminance signal read address YR_ADD and the chrominance signal read address CR_ADD, respectively, in step 1720, current write addresses are maintained for the interval 1 H in step 1740. The step 1740 is performed in the same manner as in the embodiment shown in FIG. 13, and thus a detailed description thereof will be omitted. Briefly, when a write address approaches a read address, a current write address is not increased and data is not written for the interval 1 H.

On the other hand, if it is determined that the luminance signal write address YW_ADD and the chrominance write address CW_ADD do not approach the luminance signal read address YR_ADD and the chrominance read address CR_ADD, respectively, in the step 1720, it is determined whether the luminance signal read address YR_ADD and the chrominance read address CR_ADD approach the luminance signal write address YW_ADD and the chrominance write address CW_ADD, respectively, in step 1760. If it is determined that each read address approaches each corresponding write address in the step 1760, the interval 1 H is subtracted from current luminance and chrominance signal read addresses YR_ADD and CR_ADD, respectively, in step 1770. Consequently, when luminance and chrominance signal read addresses approach luminance and chrominance signal write addresses, respectively, chrominance signal data and luminance signal data, which are stored in the first and second dual port memory devices 854 and 864 of FIG. 20, respectively, are repeatedly read two times according to read addresses corrected in the step 1770.

Alternatively, if it is determined that the luminance signal read address YR_ADD and the chrominance read address CR_ADD do not approach the luminance signal write address YW_ADD and the chrominance write address CW_ADD, respectively, in the step 1760, it is determined that the generation interval between each read address and each corresponding write address is normal, so each of the read and write addresses are increased by 1 in step 1780. The method for correcting addresses according to the address approach state is the same as in the embodiment of FIGS. 13A and 13B, and thus a detailed description thereof will be omitted.

A video signal is written and read according to the read and write addresses, which are corrected in the step 1700, in step 1800. In other words, the luminance signal Y1 and the chrominance signal C1 are written into the first and second dual port memory devices 854 and 864 according to the luminance signal write address YW_ADD and the chrominance signal write address CW_ADD, which are corrected in the step 1700, respectively. In addition, the written luminance signal Y1 and chrominance signal C1 are read from the first and second dual port memory devices 854 and 864 according to the luminance signal read address YR_ADD and the chrominance signal read address CR_ADD, which are corrected in the step 1700, respectively.

According to the present invention, the jitter correcting apparatus is applied to camcorders, televisions, monitors, and other display devices as well as VCRs. According to the present invention, the jitter of a video signal, which may occur while processing an analog video signal in a digital mode, is corrected using a memory device having a small capacity, thereby allowing a picture to be stably output. Moreover, a chrominance signal is processed using a fixed clock signal so that the uniformity of the chrominance signal can be improved and skew which may occur in each field of a picture can be minimized.

While this invention has been particularly shown and described with references to preferred embodiments thereof, it will be understood by those skilled in the art that various changes in form and detail may be made herein without departing from the spirit and scope of the invention as defined by the appended claims.

What is claimed is:

1. A jitter correcting apparatus for correcting jitter of an input video signal in a video signal reproduction system including a digital video decoder for demodulating a luminance signal of the video signal in response to a first clock signal having a variable frequency and for demodulating a chrominance signal of the video signal in response to a second clock signal of a fixed frequency, the jitter correcting apparatus comprising:
   a luminance signal address generator for generating a luminance signal write address for writing the luminance signal in response to the first clock signal, for generating a luminance signal read address for reading the luminance signal in response to the second clock signal, for comparing the luminance signal write address with the luminance signal read address, and for correcting the luminance signal read and write addresses based on a result of the comparison;
   a first dual port memory device for storing the luminance signal at a location corresponding to the luminance signal write address in response to the first clock signal and for outputting the luminance signal stored at a location corresponding to the luminance signal read address in response to the second clock signal;
   a chrominance signal address generator for generating a chrominance signal write address for writing the chrominance signal and a chrominance signal read address for reading the chrominance signal, in response to the second clock signal, for comparing the chrominance signal write address with the chrominance signal read address, and for correcting the chrominance signal read and write addresses based on a result of the comparison; and
   a second dual port memory device for storing the chrominance signal at a location corresponding to the chrominance signal write address and for outputting the chrominance signal stored at a location corresponding to the chrominance signal read address, in response to the second clock signal.

2. The jitter correcting apparatus of claim 1, further comprising:
   a synchronizing signal separator for separating horizontal and vertical synchronizing signals from the video signal; and
   a third dual port memory device for storing the separated horizontal and vertical synchronizing signals in response to the luminance signal write address and outputting the stored horizontal and vertical synchronizing signals in response to the luminance signal read address.

3. The jitter correcting apparatus of claim 2, wherein the first, second and third dual port memory devices are implemented by line memories which are capable of storing luminance signal data for more than 1 line, chrominance signal data for more than 1 line, and horizontal and vertical synchronizing signal data for more than 1 line, respectively.

4. The jitter correcting apparatus of claim 2, further comprising:

a first comparator for comparing the luminance signal write address with the luminance signal read address and for generating first and second comparison signals as a result of the comparison to the luminance signal address generator; and a second comparator for comparing the chrominance signal write address with the chrominance signal read address and for generating third and fourth comparison signals as a result of the comparison to the chrominance signal address generator.

5. The jitter correcting apparatus of claim 4, wherein the chrominance signal address generator comprises:

a chrominance signal read address generator for generating the chrominance signal read address for reading the chrominance signal in response to the second clock signal and correcting the chrominance signal read address in response to the third comparison signal output from the second comparator; and a chrominance signal write address generator for generating the chrominance signal write address for writing the chrominance signal in response to the second clock signal and correcting the chrominance signal write address in response to the fourth comparison signal output from the second comparator.

6. The jitter correcting apparatus of claim 5, wherein the chrominance signal read address generator comprises:

a head switching signal generator for outputting an externally-applied first head switching signal, or an internally-generated head switching signal comprising a line count value corresponding to a vertical synchronizing signal, in response to a predetermined video selection signal;

an error signal generator for generating first and second error signals in response to the head switching signal, the second clock signal and the written and read horizontal synchronizing signals;

a skip/hold signal generator for generating a skip signal for decreasing the chrominance signal read address or a hold signal for increasing the chrominance signal read address, in response to the first error signal;

an address controller for selecting the current chrominance signal read address or a chrominance signal read address skipped by a predetermined number, in response to the skip signal or the hold signal;

an address translator for generating an address translation signal for correcting the chrominance signal read address and adding the second error signal and a predetermined offset value to the chrominance signal write address to output a read translation address, in response to the head switching signal; and an output address output unit for outputting the read translation address in response to the address translation signal and outputting a chrominance signal read address increased by one or a chrominance signal read address generated 1 line before in response to the third comparison signal.

7. The jitter correcting apparatus of claim 6, wherein the error signal generator comprises:

an input/output synchronization difference detector for comparing the written horizontal synchronizing signal with the read horizontal synchronizing signal to generate the difference between them as the first error signal and outputting the first error signal generated at a head switching point;

a skew average generator for obtaining the average skew of a field of the video signal in response to the head switching signal; and a first adder for adding the output signal of the input/output synchronization difference detector and the output signal of the skew average generator and outputting a result of the addition as the second error.

8. The jitter correcting apparatus of claim 6, wherein the read address output unit comprises:

a first multiplexer for selectively outputting the output signal of the address controller or 1 H in response to the third comparison signal;

a second adder for adding the output of the first multiplexer to the chrominance signal read address and outputting a result of the addition;

a second multiplexer for selectively outputting the read translation address or the output of the second adder in response to the address translation signal; and a first flip-flop for receiving the output of the second multiplexer as data input and outputting the output of the second multiplexer as the chrominance signal read address in response to the second clock signal.

9. The jitter correcting apparatus of claim 5, wherein the chrominance signal write address generator comprises:

1 H signal generating means for outputting a signal having a first level for a time duration of 1 H in response to the fourth comparison signal;

AND operation means for performing a logical AND operation with respect to the output of the 1 H signal generating means and a first predetermined number and outputting a result of the logical AND operation;

an adder for adding the output of the logical AND operation means and the chrominance signal write address and outputting a result of the addition; and a flip-flop for receiving the output of the adder as data input and outputting the output of the adder as a chrominance signal write address in response to the first clock signal.

10. The jitter correcting apparatus of claim 4, wherein the luminance signal address generator comprises:

a luminance signal read address generator for generating the luminance signal read address for reading the luminance signal in response to the second clock signal and for correcting the luminance signal read address in response to the first comparison signal output from the first comparator; and a luminance signal write address generator for generating the luminance signal write address for writing the luminance signal in response to the first clock signal and for correcting the luminance signal write address in response to the second comparison signal output from the first comparator.

11. A method for correcting jitter of an input video signal comprising a chrominance signal, a luminance signal and horizontal and vertical synchronizing signals, during writing of the video signal into corresponding dual port memory devices and reading of the written video signal, the method comprising the steps of:

(a) generating luminance and chrominance signal write addresses in response to a first clock signal having a variable frequency or in response to a second clock signal having a fixed frequency and generating luminance and chrominance signal read addresses in response to the second clock signal;

(b) correcting a horizontal cycle of the video signal and generating an error value corresponding to the average skew of a field of the video signal;

(c) resetting the luminance and chrominance signal read addresses when a head switching signal is generated in response to the error value to compensate for accumulated errors between write addresses and read addresses;

(d) determining approach states between the luminance and chrominance signal write addresses and the luminance and chrominance signal read addresses, respectively, after step (c), and correcting the write addresses or the read addresses; and (e) writing and reading the video signal in response to the corrected luminance and chrominance signal write and read addresses.

12. The method of claim 11, wherein the step (b) comprises the steps of:

(b1) determining whether the cycle of the written horizontal synchronizing signal is different from the cycle of the read horizontal synchronizing signal;

(b2) holding or skipping the chrominance signal read address if it is determined that the cycles are different in the step (b1) to correct such that the chrominance signal is synchronized with the luminance signal; and (b3) adding differences between written horizontal synchronizing signals and corresponding read horizontal synchronizing signals to an average of video skew occurring in a field after step (b2) to generate the error value.

13. The method of claim 11, wherein the step (d) comprises the steps of:

(d1) determining whether the luminance and chrominance signal write addresses approach the luminance and chrominance signal read addresses, respectively;

(d2) maintaining the luminance and chrominance signal write addresses without increase during an interval 1 H if it is determined that the luminance and chrominance signal write addresses approach the luminance and chrominance signal read addresses in step (d1);

(d3) determining whether the luminance and chrominance signal read addresses approach the luminance and chrominance signal write addresses if it is determined that the luminance and chrominance signal write addresses do not approach the luminance and chrominance signal read addresses in step (d1);

(d4) subtracting 1 H from each of the luminance and chrominance signal read addresses if it is determined that the luminance and chrominance signal read addresses approach the luminance and chrominance signal write addresses in step (d3); and (d5) increasing each of the luminance and chrominance signal write and read addresses by one if it is determined that the luminance and chrominance signal read addresses do not approach the luminance and chrominance signal write addresses in the step (d3).

* * * * *

UNITED STATES PATENT AND TRADEMARK OFFICE
CERTIFICATE OF CORRECTION

PATENT NO.         : 7,212,724 B2
APPLICATION NO. : 10/874073
DATED                 : June 22, 2004
INVENTOR(S)       : Lee Jesuk It is certified that error appears in the above-identified patent and that said Letters Patent is hereby corrected as shown below:

Column 30, line 11 delete "1 H" and insert -- - 1 H --

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,212,724 B2  Page 1 of 1
APPLICATION NO. : 10/874073
DATED : May 1, 2007
INVENTOR(S) : Lee Jesuk It is certified that error appears in the above-identified patent and that said Letters Patent is hereby corrected as shown below:

Column 30, line 11 delete "1 H" and insert -- - 1 H --

This certificate supersedes Certificate of Correction issued November 27, 2007.

Signed and Sealed this

Twenty-fifth Day of December, 2007

JON W. DUDAS
*Director of the United States Patent and Trademark Office*